US012533586B2

(12) United States Patent
Sherwani et al.

(10) Patent No.: US 12,533,586 B2
(45) **Date of Patent: *Jan. 27, 2026**

(54) SERVER-BASED MECHANICS HELP DETERMINATION FROM AGGREGATED USER DATA

(71) Applicant: Sony Interactive Entertainment Inc., Tokyo (JP)

(72) Inventors: Adil Ahmed Sherwani, Oakland, CA (US); Mischa G. Stephens, San Francisco, CA (US); Xiaohan Zhang, Albany, CA (US); Jay Robert Franck, San Francisco, CA (US); Nitin Y. Mohan, San Francisco, CA (US); Oscar Michael Sanchez, South San Francisco, CA (US); Derek Andrew Parker, South San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 717 days.

This patent is subject to a terminal disclaimer.

(21) Appl. No.: 17/472,508

(22) Filed: Sep. 10, 2021

(65) Prior Publication Data

US 2021/0402301 A1 Dec. 30, 2021

Related U.S. Application Data

(63) Continuation of application No. 16/687,389, filed on Nov. 18, 2019, now Pat. No. 11,123,639.

(51) Int. Cl.

*A63F 13/5375* (2014.01)
*A63F 13/35* (2014.01)

(Continued)

(52) U.S. Cl.

CPC .......... *A63F 13/5375* (2014.09); *A63F 13/35* (2014.09); *A63F 13/67* (2014.09); *A63F 13/86* (2014.09)

(58) Field of Classification Search

CPC ...... A63F 13/5375; A63F 13/35; A63F 13/67; A63F 13/86

See application file for complete search history.

(56) References Cited

U.S. PATENT DOCUMENTS 6,352,479 B1 3/2002 Sparks, II
8,126,933 B2 2/2012 Nishiyama (Continued)

FOREIGN PATENT DOCUMENTS

CN 1848124 A 10/2006
CN 102834151 A 12/2012

(Continued)

OTHER PUBLICATIONS

PCT/US2020/059427 , "International Search Report and Written Opinion", Feb. 3, 2021, 13 pages.

(Continued)

*Primary Examiner* — Jeffrey K Wong
(74) *Attorney, Agent, or Firm* — Fish & Richardson P.C.

(57) ABSTRACT

Techniques for improving a user video game experience are described. In an example, a computer system receives event data from a plurality of user devices. Each event data includes an identifier of an activity in a video game and data indicating completion of the activity. The identifier can be predefined in program code of the video game. The identifier and completion data can be received based on an execution of the program code. The event data is processed to determine a video game mechanic suggestion to help a player complete the activity.

20 Claims, 16 Drawing Sheets

(51) Int. Cl.
*A63F 13/67* (2014.01)
*A63F 13/86* (2014.01)

(56) References Cited

U.S. PATENT DOCUMENTS 8,260,728 B1 9/2012 Walsh et al.
8,515,253 B2 8/2013 Cottrell
8,690,656 B2 4/2014 Yamada et al.
9,358,466 B2 6/2016 Kruglick
9,364,743 B2 6/2016 Miura et al.
9,421,467 B2 8/2016 Miyamoto
9,457,264 B1 10/2016 Chyou et al.
9,533,215 B1 1/2017 Wakeford et al.
9,630,097 B2 4/2017 Paradise et al.
9,662,565 B1 5/2017 Riordan
9,666,029 B1 5/2017 Yu et al.
9,669,295 B1 6/2017 Harrington et al.
9,782,678 B2 10/2017 Long et al.
9,962,605 B1 5/2018 Wei et al.
9,981,189 B1 5/2018 Wakeford et al.
10,223,449 B2 3/2019 Smith et al.
10,232,269 B1 3/2019 Harrington et al.
10,279,264 B1 5/2019 Aghdaie et al.
10,286,323 B2 5/2019 Aghdane et al.
10,335,690 B2 7/2019 Schleicher
10,387,782 B2 8/2019 Kon
10,427,055 B2 10/2019 Watari et al.
10,456,680 B2 10/2019 Miron et al.
10,780,357 B2 9/2020 Ryan et al.
10,857,464 B2 12/2020 Sulakhe
11,071,910 B1 7/2021 Landers et al.
11,117,057 B2 9/2021 Hiatt et al.
11,123,639 B2 9/2021 Sherwani et al.
11,130,061 B2 9/2021 Sherwani et al.
11,338,210 B2 5/2022 Benedetto et al.
11,504,618 B2 11/2022 Sherwani et al.
11,534,694 B2 12/2022 Hiatt et al.
11,673,051 B2 6/2023 Sherwani et al.
11,992,762 B2 5/2024 Sherwani et al.
2001/0016510 A1 8/2001 Ishikawa et al.
2002/0039952 A1 4/2002 Clem
2003/0216177 A1 11/2003 Aonuma et al.
2005/0009610 A1 1/2005 Miyamoto et al.
2005/0246638 A1 11/2005 Whitten
2006/0046234 A1 3/2006 Sperry
2006/0258462 A1 11/2006 Cheng et al.
2007/0294089 A1 12/2007 Garbow et al.
2008/0096663 A1* 4/2008 Lieberman .............. A63F 13/12 463/42
2008/0268960 A1 10/2008 Farrier et al.
2009/0209337 A1 8/2009 Vrignaud et al.
2010/0041475 A1* 2/2010 Zalewski ................ A63F 13/47 463/30
2010/0121808 A1 5/2010 Kuhn
2011/0246621 A1 10/2011 May, Jr. et al.
2011/0269540 A1 11/2011 Gillo et al.
2011/0281648 A1 11/2011 Weising
2011/0306395 A1 12/2011 Ivory et al.
2012/0021840 A1 1/2012 Johnson et al.
2012/0202594 A1 8/2012 Bistis et al.
2013/0005452 A1 1/2013 Chatani
2013/0005471 A1 1/2013 Chung et al.
2013/0006403 A1 1/2013 Moore et al.
2013/0059634 A1 3/2013 Behmaram-Mosavat et al.
2013/0079134 A1 3/2013 Walker et al.
2013/0249947 A1 9/2013 Reitan
2013/0260894 A1 10/2013 Graf et al.
2014/0038701 A1 2/2014 Allen et al.
2014/0080556 A1 3/2014 Knutsson
2014/0080558 A1 3/2014 Knutsson
2014/0080559 A1 3/2014 Knutsson et al.
2014/0080560 A1 3/2014 Knutsson
2014/0080561 A1 3/2014 Knutsson
2014/0080600 A1 3/2014 Knutsson et al.
2014/0080601 A1 3/2014 Knutsson
2014/0081438 A1 3/2014 Knutsson
2014/0106876 A1 4/2014 Knutsson et al.
2014/0106877 A1 4/2014 Knutsson et al.
2014/0106878 A1 4/2014 Knutsson
2014/0113704 A1 4/2014 Knutsson
2014/0128159 A1 5/2014 Knutsson
2014/0135102 A1 5/2014 Knutsson
2014/0135104 A1 5/2014 Knutsson
2014/0135120 A1 5/2014 Knutsson et al.
2014/0162780 A1 6/2014 Suzuki
2014/0256420 A1 9/2014 Justice et al.
2014/0258469 A1 9/2014 Maharajh et al.
2014/0278686 A1 9/2014 Mullings et al.
2014/0349750 A1 11/2014 Thompson et al.
2014/0370979 A1* 12/2014 Zahn ....................... A63F 13/00 463/31
2015/0153906 A1 6/2015 Liao et al.
2015/0157929 A1 6/2015 Hall et al.
2015/0157938 A1 6/2015 Domansky et al.
2015/0231502 A1 8/2015 Allen et al.
2015/0382061 A1 12/2015 Maisenbacher et al.
2016/0016077 A1 1/2016 Yokota et al.
2016/0158652 A1 6/2016 Wright et al.
2016/0255409 A1 9/2016 Feldstein et al.
2016/0266740 A1 9/2016 Glasgow
2016/0279521 A1 9/2016 Knutsson et al.
2016/0287992 A1 10/2016 Knutsson et al.
2016/0303475 A1 10/2016 Norden
2016/0310843 A1 10/2016 Webb
2016/0317927 A1 11/2016 Miyamoto
2016/0367896 A1 12/2016 Lee et al.
2017/0007920 A1 1/2017 Knutsson
2017/0064014 A1 3/2017 Nomura
2017/0087460 A1 3/2017 Perry
2017/0087475 A1 3/2017 Perry
2017/0173471 A1 6/2017 Knutsson et al.
2017/0259177 A1 9/2017 Aghdaie et al.
2017/0266568 A1 9/2017 Lucas et al.
2017/0270128 A1 9/2017 Smith et al.
2017/0282063 A1 10/2017 Krishnamurthy
2017/0282077 A1 10/2017 De La Cruz
2017/0282079 A1 10/2017 De La Cruz
2017/0328724 A1 11/2017 Lobo et al.
2017/0351922 A1 12/2017 Campbell
2017/0357853 A1 12/2017 Castanon et al.
2018/0001194 A1 1/2018 Sherwani et al.
2018/0001206 A1 1/2018 Osman et al.
2018/0104592 A1 4/2018 Knutsson et al.
2018/0111041 A1 4/2018 Bress et al.
2018/0161673 A1 6/2018 Pasternack et al.
2018/0207522 A1 7/2018 Roman et al.
2018/0221761 A1 8/2018 Knutsson et al.
2018/0239959 A1 8/2018 Bui et al.
2018/0243654 A1 8/2018 Wakeford et al.
2018/0365935 A1 12/2018 Howell et al.
2019/0209924 A1 7/2019 Harrington et al.
2019/0217203 A1 7/2019 Ryan et al.
2019/0232168 A1 8/2019 Benedetto et al.
2019/0232169 A1 8/2019 Benedetto et al.
2019/0262707 A1 8/2019 Campbell
2019/0336859 A1 11/2019 Panesar et al.
2019/0388785 A1 12/2019 Kumar et al.
2020/0030702 A1 1/2020 Benedetto
2020/0061465 A1 2/2020 Benedetto et al.
2020/0122031 A1 4/2020 Sherwani et al.
2020/0139239 A1 5/2020 Lee et al.
2020/0139245 A1 5/2020 Jarzebinski
2020/0289932 A1 9/2020 Benedetto et al.
2021/0038998 A1 2/2021 Tallarico et al.
2021/0086089 A1 3/2021 Pardeshi et al.
2021/0146239 A1 5/2021 Hiatt et al.
2021/0146241 A1 5/2021 Bleasdale-Shepherd et al.
2021/0146244 A1 5/2021 Sherwani et al.
2021/0146261 A1 5/2021 Hiatt et al.
2021/0151034 A1 5/2021 Hasan et al.
2021/0213353 A1 7/2021 Berg et al.
2021/0362063 A1 11/2021 Hiatt et al.
2021/0370183 A1 12/2021 Dorn et al.
2022/0019744 A1 1/2022 Yu et al.

(56) References Cited

U.S. PATENT DOCUMENTS

| | | | |
|---|---|---|---|
| 2022/0096937 A1 | 3/2022 | Dorn et al. |
| 2022/0358917 A1 | 11/2022 | Chaland et al. |
| 2023/0041552 A1 | 2/2023 | Sherwani et al. |
| 2023/0078380 A1 | 3/2023 | Zaghetto et al. |
| 2024/0082734 A1 | 3/2024 | Benedetto et al. |
| 2024/0412036 A1 | 12/2024 | Krishnan et al. |

FOREIGN PATENT DOCUMENTS

| | | | |
|---|---|---|---|
| CN | 105050672 A | 11/2015 |
| CN | 105246567 A | 1/2016 |
| CN | 107158702 A | 9/2017 |
| CN | 107661628 A | 2/2018 |
| CN | 110180180 A | 8/2019 |
| EP | 3028751 A2 | 6/2016 |
| EP | 3513850 A2 | 7/2019 |
| JP | 2002191868 A | 7/2002 |
| JP | 2003325973 A | 11/2003 |
| JP | 2005027996 A | 2/2005 |
| JP | 2008295776 A | 12/2008 |
| JP | 2009011568 A | 1/2009 |
| JP | 2009-201809 A | 9/2009 |
| JP | 2010063840 A | 3/2010 |
| JP | 2011-218102 A | 11/2011 |
| JP | 2013528432 A | 7/2013 |
| JP | 2014228725 A | 12/2014 |
| JP | 2015097803 A | 5/2015 |
| JP | 2017164552 A | 9/2017 |
| JP | 2019524212 A | 9/2019 |
| KR | 20180075931 A | 7/2018 |
| WO | WO 2014100770 A2 | 6/2014 |
| WO | WO 2021156848 A1 | 8/2021 |

OTHER PUBLICATIONS

PCT/US2020/059427 , "International Preliminary Report on Patentability", Jun. 2, 2022, 9 pages.
askagamedev.tumblr.com [online], "Dynamic resolution Scaling has become a common," Nov. 24, 2020. retrieved on Jun. 14, 2023, retrieved from URL <https://askagamedev.tumblr.com/posl/635692229684510720/dynamic-resolutionscaling-has-become-a-common>, 5 pages.
Cheng et al. "TallFormer: Temporal Action Localization with a Long-memory Transformer," CoRR, Submitted on Jul. 26, 2022, arXiv:2204.01680v2, 22 pages.
Chittaro et al., "VU-Flow: A Visualization Tool for Analyzing Navigation in Virtual Environments," IEEE Transactions on Visualization and Computer Graphics, Nov. 2006, 12(6):1475-1485.
Clark et al., "Electra: Pre-training Text Encoders as Discriminators Rather Than Generators," Paper, ICLR 2020, Mar. 2020, 18 pages.
definecpu.com [online], "What Is Dynamic Resolution Scaling? Real-time Rendering will Prioritize the FPS," Aug. 22, 2022, retrieved on Jun. 14, 2023, retrieved from URL<https://definecpu.com/dynamic-resolution-scaling/>, 10 pages.
Drachen et al., "Analyzing Spatial User Behavior in Computer Games Using Geographic Information Systems," Poster Proceedings of the 13th International Mindtrek Conference, Tampere, Finland, Sep. 2009, pp. 182-189.
Dutoit, "High Quality Text to Speech Synthesis: An Overview," Faculte Polyechnique de Mons, TCTS lab, 1997, 21 pages.
eurogamer.net [online], "Radeon Boost analyzed: is AMD's new dynamic resolution technology a game-changer?" Dec. 19, 2019, retrieved on Jun. 14, 2023, retrieved from URL<https://www.eurogamer.net/digitalfoundry-2019adeon-soflware-adrenalin-2020-radeon-boost-analysis>, 5 pages.
Gagne et al., "A Deeper Look at the Use of Telemetry for Analysis of Player Behavior in RTS Games," Big Data Analytics in the Social and Ubiquitous Context: 5th International Workshop on Modeling Social Media, Oct. 5, 2011, pp. 247-257.
Hochreiter et al., "Long Short-term memory," Neural Computation, 1997, 9(8):1735-1780.
Hoobler et al., "Visualizing Competitive Behaviors in Multi-User Virtual Environments," IEEE Visualization, Oct. 10-15, 2004, pp. 163-170.
Nadkami et al., "Natural Language Processing: an introduction," J. Am. Med. Assoc., 2011, 18:544-551.
Radford et al., "Improving Language Understanding by Generative Pre-training," Open AI, Jun. 2018, 12 pages.
Sasirekha et al., "Text to Speech: A simple Tutorial," Int. J. of Sort Computing and Eng. (IJSCE), Mar. 2012, 2(1):275-278.
Vaswani et al., "Attention Is All You Need," CoRR, Submitted on Dec. 6, 2017, arXiv:1706.03762, 15 pages.
Zhuang et al., "A Comprehensive Survey on Transfer Learning," CoRR, Submitted on Jun. 23, 2020, arXiv:1911.02685v3, 31 pages.
EP20816348.5 , "Office Action", Oct. 18, 2024, 5 pages.

* cited by examiner

1300

| Mechanic Tip Type | Mechanic Help Tip |
|---|---|
| Mechanic Use | Help Tip<br>Use Fireball |
| Mechanic Avoidance | Help Tip<br>Avoid Sword Attack |
| Target Actor | Help Tip<br>Use Fireball against Boss |
| Basic Mechanic Mitigation | Help Tip<br>Use Parry against Sword Attack |
| Mechanic Mitigation | Help Tip<br>Use Shield when Boss uses Sword Attack |

FIG. 13

SERVER-BASED MECHANICS HELP DETERMINATION FROM AGGREGATED USER DATA

CROSS-REFERENCES TO RELATED APPLICATIONS

This application is a continuation of U.S. application Ser. No. 16/687,389, filed Nov. 18, 2019, which is hereby incorporated by reference in its entirety for all purposes.

BACKGROUND

Video games are available on different computing devices. For example, a user operates a video game console and a mobile device to play a first video game and a second video game, respectively. In addition, video games are available from different sources. For example, the video game console is operable to play multiple video games from two or more different video game developers.

Given the increasing number of video games and their availability on different computing devices and from different sources, the user experience typically changes. For example, the way game play help may be sought can vary significantly between video games. In addition, the way a particular part of a video game is surfaced on a computing device as being available for playing can be unique to the particular video game.

Hence, the user experience may not be common between the video game players. There is a need for improving the user experience such that, regardless of the underlying video games, some commonality in video game functionalities becomes possible.

BRIEF SUMMARY

Techniques for improving a user video game experience are described. In an example, a computer system is used for presentation of video game-related information. The computer system includes one or more processors and one or more non-transitory computer readable storage media (e.g. one or more memories) storing instructions that, upon execution by the one or more processors, cause the computer system to perform operations.

In an example, the operations include receiving an activity identifier of an activity completed by a first video game player in a video game and a mechanic identifier of a mechanic used in the video game during the activity. The mechanic includes at least one of: a set of tools, a set of capabilities, or a set of skills available in the video game. The activity identifier and the mechanic identifier are predefined in program code of the video game and are received based on an execution of the program code. The operations also include storing the activity identifier and the mechanic identifier in a data store. The operations also include determining, based on activity identifiers and mechanic identifiers stored in the data store for a plurality of video game players, that the plurality of video game players used the mechanic in the activity. The operations also include generating information about the mechanic to complete the activity, and presenting the information in a user interface to a second video game player of the video game that has not completed the activity.

In an example, the operations further include determining that the mechanic is available to the second video game player. The information is presented based on the mechanic being available.

In an example, the information includes at least one of: a text description, a link to a graphical animation, a link to a video file, or a link to an audio file. The information is presented in a window over at least a portion of video game content of the video game. In this example, the window includes a first option to show the information adjacent to the video game content and a second option to show the information in a picture-in-picture window over the video game content. The window further includes a link to a video about using the mechanic to complete the activity. Additionally, the window further includes a map that corresponds to a zone within the video game content. The zone shows an estimated position of where the activity was completed by the plurality of video game players and a current position of a virtual player within the video game content. The virtual player corresponds to the second video game player.

In an example, determining that the mechanic was used by the plurality of video game players includes: generating a score for the mechanic based on a frequency of the mechanic identifier during the activity from data stored for the plurality of video game players in the data store. In this example, the operations further include receiving, after the presentation of the information and before receipt of a second activity identifier, the activity identifier, the mechanic identifier, and an outcome of completing the activity by the second video game player, determining that the outcome is a successful completion, and updating the score based on the successful completion. In addition, the operations further include ranking, based on the score, the mechanic relative to one or more other mechanics available to complete the activity, and selecting the mechanic for presentation to the second video game player based on the ranking.

In an example, the mechanic is used in the video game during the activity to at least one of: (i) assist the first video game player improving at least one of the set of tools, the set of capabilities, or the set of skills, or (ii) assist the first video game player playing against another video game player or interacting with a video game object. The video game is associated with a video game developer. In this example, the operations further include prior to presenting the information about the mechanic, receiving a confirmation of the video game developer that the information is valid.

In an example, determining that the mechanic was used by the plurality of video game players includes: accessing, from the data store, data for the plurality of video game players. The data includes the activity identifier, the mechanic identifier, and a successful completion or a failed completion for each of the plurality of video game players. Determining that the mechanic was used by the plurality if video game players further includes determining, from the data, that a use of the mechanic to complete the activity has a successful completion rate higher than a predefined threshold. The information indicates the use of the mechanic to complete the activity.

In an example, determining that the mechanic was used by the plurality of video game players includes: accessing, from the data store, data for the plurality of video game players. The data includes the activity identifier, the mechanic identifier, and a successful completion or a failed completion for each of the plurality of video game players. Determining that the mechanic was used by the plurality if video game players further includes determining, from the data, that a use of the mechanic to complete the activity has a failed completion rate higher than a predefined threshold. The information indicates avoidance of the use of the mechanic to complete the activity.

In an example, determining that the mechanic was used by the plurality of video game players includes: accessing, from the data store, data for the plurality of video game players. The data includes the activity identifier, the mechanic identifier, and a successful completion or a failed completion for each of the plurality of video game players. Determining that the mechanic was used by the plurality if video game players further includes determining, from the data, that a use of the mechanic to complete the activity when a condition is presented in the activity has a successful completion rate higher than a predefined threshold. The information indicates the use of the mechanic to complete the activity when the condition is present.

In an example, the operations further include ranking the mechanic for the second video game player relative to one or more other mechanics available to complete the activity based on at least one of: an availability of the mechanic from an account of the second video game player, a spoiler included in the mechanic about the activity or the video game, an availability of the mechanic from an application store, or a history of use of the mechanic by the second video game player.

In an example, generating the information includes: determining a history of use of the mechanic by the second video game player, and personalizing the information for the second video game player based on the history.

In an example, generating the information includes: determining an availability of the mechanic from an in-game store, an application store, or a platform store, and personalizing the information for the second video game player based on the availability.

In an example, the operations further include accessing, from the data store, data for the plurality of video game players. The data includes the activity identifier, the mechanic identifier, and a difficulty setting for playing the video game. The operations further include associating the information about the mechanic with the difficulty setting.

In an example, the activity is a task from a plurality of tasks that form a second activity. In this example, the operations further include presenting a window in a first state to the second video game player. The window identifies the second activity and presented over video game content of the video game. The operations further include presenting the window in an expanded state upon a selection of the second activity. The window in the expanded state identifies the tasks of the second activity. The operations further include updating the window in the expanded state to show the information about the mechanic upon a selection of the activity from the tasks. In this example, the operations further include: determining a second mechanic available to complete the activity, determining that the mechanic has a higher ranking than the second activity, and presenting the information in the window in the expanded state based on the higher ranking. The window further includes an option to replace the presentation of the information with a presentation of second information about the second mechanic.

In an example, the operations further include receiving a first event indicating that the mechanic is used by the first video game player during the activity and a second event indicating an impact of using the mechanic on a game play in the activity. The information is generated further based on the first event and the second event.

BRIEF DESCRIPTION OF THE DRAWINGS

FIG. 13 illustrates examples of mechanic tip types, according to embodiments of the present disclosure.

DETAILED DESCRIPTION

Figure 1:
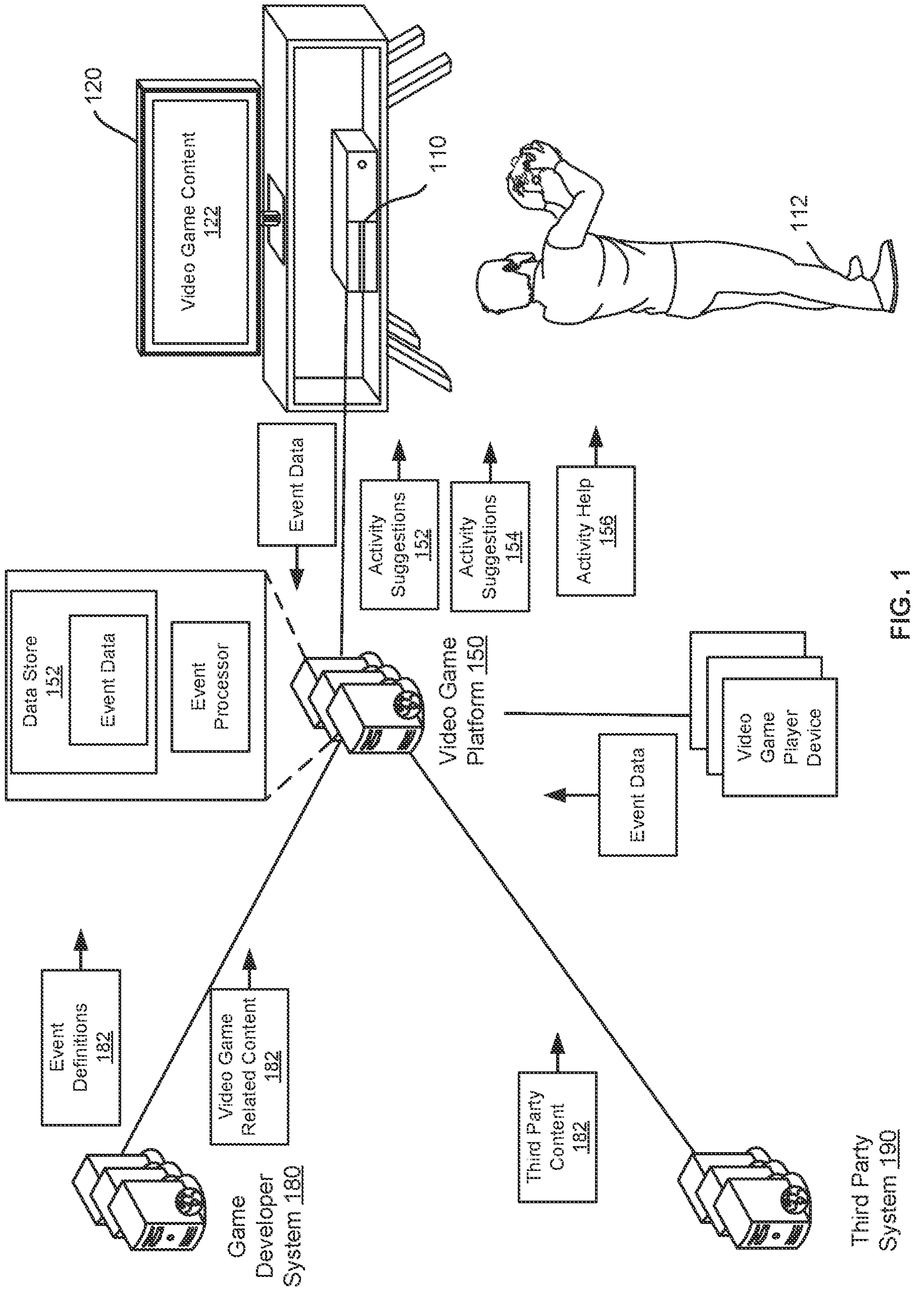
FIG. 1 illustrates an example of a computing environment for collecting and processing video game events, according to embodiments of the present disclosure.

Generally, systems and methods for improving a user video game experience are described. In an example, the user video game experience is improved by providing a unified way for, among other things, multiple video game functionalities, such as for suggesting video game activities, estimating completion time for such activities, and presenting video game help regardless of the underlying video game(s). This unified way need not change how a video game is developed or necessitate a common approach to video game development. Instead, instrumentation of various events in the video games are relied upon, where a video game platform (e.g. a server-based video game service) can collect and process such events based on the execution of the video games to suggest the video game activities, estimate completion times, present the video game help at a client level and, as needed, customize such video game functionalities to the client.

For instance, a video game platform collects event data including mechanic identifiers and activity identifiers associated with a successful completion outcome for an activity. The data, collected from many users of the video game platform, is aggregated and processed to identify the most impactful mechanics associated with successful outcomes for activities. The platform then determines which mechanic or mechanics are most strongly correlated with a player successfully completing a given activity, as well as which mechanics should be avoided and high-impact targets for the player to select when using the mechanic. In addition, the platform determines mechanic mitigation information, such as identifying which mechanic to use in response to a particular action in the activity.

The video game platform can generate suggestions for a mechanic, a target, an avoidance strategy, and a mitigation strategy to help players successfully complete the activity. From the plurality of available mechanics associated with an activity, the video game platform ranks the mechanics based on impact and effectiveness.

In addition, a mechanic tip can be customized depending on data associated with a specific video game player and/or the input device. In particular, the video game platform can determine player-specific information, including mechanic availability, historical data about prior use of the mechanic, the current in-game characteristics of the user including inventory and load out, as well as the hardware configuration used by the player during the activity (e.g. playing on a video game console, a personal computer with keyboard and mouse, a mobile device, etc.). The video game platform can filter the mechanic tip for the player's current state, for example, by eliminating mechanics that are unavailable, and then prioritize the mechanics that are best matched with the player's propensity to engage with the tip. Finally, the video game platform modifies mechanic help tips to account for the player's prior usage of the mechanic, for example, by including language referring to a player's history of using the relevant mechanic.

To illustrate, consider an example of a video game activity related to capturing or defeating a non-player character against which the player is opposed in a combat activity. The activity may include multiple sub-activities, such as entering a location that includes the opponent character and clearing an obstacle in the location. The video game platform determines that the plurality of video game players have used a particular skill to enter the location, a tool to clear the obstacle, and a capability to capture the opponent. The video game platform also determines that the player is vulnerable to a capability used by the non-player character during the combat activity, and surfaces a mechanic avoidance tip for the player to avoid the capability when it is used. The video game platform also determines that the player does not have available the particular skill, and determines instead a different skill that is also highly correlated to successful completion of the entry sub-activity, including a determination of the player's familiarity with the different skill. Finally, the video game platform presents a graphical user interface for the player to request and receive help information, including the personalized mechanic tip.

Embodiments of the present disclosure provide many technical advantages over existing video game platforms. For instance, functionalities of a user interface, such as a graphical user interface (GUI), are improved. In particular, by collecting events per activity, video game, and video game player, a video game platform of the present disclosure can accurately determine the most suitable mechanics to improve the likelihood of a successful activity completion. Because an accurate determination can be generated, multiple user interface functionalities become possible. In particular, a help tip window in a video game can be presented on the user interface to present the mechanic tip. Further, the presentation can follow a common style across activities (in the video game and additional video games) and across different types of computing devices (e.g. the same information can be surfaced on a video game console and on a mobile device).

FIG. 1 illustrates an example of a computing environment for collecting and processing video game events, according to embodiments of the present disclosure. As illustrated, the computing environment includes a video game console 110, video game player devices 130, a video game platform 150, a video game developer system 170, and a third party system 190. Video games are available to the video game console 110 from the video game developer system 170 through the video game platform 150. Video content, such as help videos demonstrating how video game activities can be played, is also available to the video game console 110 from the third party system 190 through the video game platform 150. The video game platform 150 collects, stores, and processes events from the video game player devices 130 and the video game console 110 to provide various video game-related functionalities including, for instance, suggesting video game activities, estimating completion time for such activities, and presenting video game help.

In an example, the video game console 110 represents a computing device available to a user 112 and operable to interact with one or more applications including video games. A display 120 communicatively coupled or integrated with the video game console 110 can present video game-related data, including video game content 122, to the user 112. Other types of computing devices can be available to the user 112 including for instance, a smartphone, a tablet, a laptop, a desktop computer, or other devices with suitable memories and processors.

The video game console 110 can execute a video game locally to present the video game content 122 on the display 120. Additionally or alternatively, the video game consoles 110 can receive the video game content 122 based on an execution of an instance of the video game application on the video game platform 150, the video game developer system 170, or another remote computer system. The video game can also be downloadable to the video game console 110 from such systems.

Further, the video game console 110 can, directly or through the video game platform 150, download or stream video content from the third party system 190 for presentation on the display 120. An example of video content includes a video file generated by the video game developer 170 and uploaded to the third party system 190, where this video file demonstrates how a video game can be played, a set of activities in the video game can be played, or a set of mechanics in an activity can be used to play the activity. A mechanic generally represents at least one of a set of tools, a set of capabilities, or a set of skills available to play an activity or a portion of an activity. Another example of video content includes a video file generated by one of the video game player devices and uploaded to the third party system 190 directly or through the video game platform 190, where the video file records the game play of a video game player operating the video game player device. Likewise, a similar video file can be uploaded to the third party system 190 from the video game console 110.

In an example, the video game player devices 130 represent computing devices of video game players that may, but need not, include the user 112. Similar functionalities can be provided on each one of the video game player devices and the video game console 110.

In an example, the video game system 170 represents a computer system that includes a set of computing resources for developing video games and available to a video game developer. In particular, the video game system 170 can store video game software 172, upload such software 172 to the video game platform 150, and/or download such software 172 to the video game console 110.

The video game software 172 of a video game is program code executable to present and interact with video game content of the video game. The program code can include predefined instrumentations to generate events upon the execution of the program code. In particular, the program code includes a set of event definitions 174, where an event definition represents code defining an identifier of an event and data to be reported for the event. Examples of such event definitions 174 are further described herein below and are predefined in the program code of the video game according to event templates available from the video game platform 150. Such event templates can be defined by a service provider of the video game platform 150 and can be commonly used across multiple video game developer systems 170.

In an example, the third party system 190 represents a computer system, such as one or more content servers, for providing video content 192 to the video game console 110 directly or indirectly through the video game platform 150. As explained herein above, the video content 192 can include video files demonstrating how a video game can be played, a set of activities in the video game can be played, or a set of mechanics in an activity can be used to play the activity. The video content 192 can be uploaded to the third party system 190 from the video game developer system 170, the video game console 110, and/or one or more of the video game player devices 130 directly or indirectly through the video game platform 150.

In an example, the video game platform 150 represents a computer system that provides various video-game related functionalities to the video game console 110. For instance, the video game platform 150 is set-up as a hub between the video game console 110, the video game player devices 130, the video game developer system 170, and third party system 190. In particular, the video game software 172 and the video content 192 can be downloaded to the video game consoler 110 through the video game platform 150. An instance of a video game based on video game software stored on the video game platform 150 can be instantiated for the video game console 110. A video file can be streamed through the video game platform 150 to the video game console 110. And communications data (e.g. messages, commands, etc.) can be exchanged between the video game console 110 and the video game player devices 130 through the video game platform 150.

Furthermore, the video game platform receives event data 114 from the video game console 110 and event data 132 from the video game player devices 130 and stores such received data in a data store 152 as event data 154. An event processor 156 of the video game platform 150 processes the event data 154 to generate and send any of an activity time estimation 162, an activity suggestion 164, and an activity help 166 to the video game console 110 for presentation on the display 120.

Received event data (any of the event data 114 or event data 132) represents data reported from a device (e.g. the video game console 110 or one of the video game player devices 130 as application) for an event based on an execution of program code of a video game, where the program code includes an event definition for the event. The activity time estimation 162 represents an estimated length of time to complete an activity in the video game, which may be referred to herein as completion time. The activity suggestion 164 represents information suggesting an activity available to the user 112 in the video game and not previously performed or completed by the user 112. An activity help 166 includes information, such as a video file, textual description, and/or a graphical description about completing an activity in the video game or using a mechanic in at least a portion of the activity. The processor 156 executes logic that, for instance, performs a statistical analysis across a subset of the event data 154 associated with the activity to generate the activity time estimation 162, the activity suggestion 164, and the activity help 166. In addition, the processor 156 can execute logic that customizes any of the activity time estimation 162, the activity suggestion 164, or the activity help 166 based on a context of the user 110 in the video game and/or within the platform and on the type of the video game console 110.

Generally, an activity is a unit of game play inherent to the structure of a video game. Different categories of activities exist including progress activities, competitive activities, challenge activities, and open ended activities. The activity can be defined in a program code as object with multiple properties. The properties include an activity identifier, a name, and a category. The activity identifier is a unique identifier of the activity. When an event about the activity is reported to the video game platform 150, the corresponding event data refers to the activity identifier. The name can be a short localized name of the activity. Other properties are possible including, for instance, a description (e.g. a longer description of the activity), an image of the activity, a default availability (e.g. whether the activity is available to all video game players before launching the video game), whether completion of the activity is required to complete the video game, whether the activity can be played repeatedly in the video game, and nested Tasks (child activities, also referred to herein as sub-activities). Multiple events about the activity are possible.

An example of an event about the activity can indicate changes in activity availability for a video game player (e.g. the user 112). This is primarily used to decide what activities to display and to remove spoiler block for those activities (where an activity having a spoiler may not be surfaced to the video game player). A property of this event includes, for instance a list (e.g. array) of activities that are currently available.

An example of an event about the activity can indicate that the video player is currently participating in the activity or task (e.g. a child activity). A property of this event includes, for instance the activity identifier of the activity. Another property can optionally be a time corresponding to the start of the participation in the activity.

An example of an event about the activity can indicate the end of the activity or task (e.g. a child activity). A property of this event includes, for instance the activity identifier of the activity. Another property can optionally be a time corresponding to the end of the participation in the activity. Yet another property can optionally be an outcome of the activity, such as completed, failed, or abandoned.

The video game platform 150 can also collect data about a zone in a video game, where this data is reported similarly to the events based on predefinitions in program code of the video game. The zone represents an area of a game world of the video game (e.g. a virtual world) with a single coordinate system. The zone may have a two-dimensional (2-D) map image associated with it, used to display locations on the zone. The zone can be defined in the program code as an object with multiple properties. The properties include a zone identifier and a name. The zone identifier is a unique identifier of the zone. The name can be a short localizable name of the zone. Other properties are possible including, for instance, an indication of whether the object should be treated as hidden for spoiler block uses cases (the default may be set to false), a map (e.g. a high resolution image for the zone 2-D map), a view projection (e.g. a matrix (4×4) to convert from three-dimensional (3-D) work coordinates to 2-D map position), and an image (e.g. a display image for the zone if different from the map). Multiple events about the zone are possible.

An example of an event about the zone can indicate an update to the current in-game location of the video game player. This event can be reported regularly, or whenever the player's in-game location changes significantly. A property of this event includes the zone identifier. Other properties are possible, such as optionally position (e.g. x,y,z position of the video game player character (the virtual player of the video game player) in the zone) and orientation (e.g. x,y,z vector indicating the video game player character's direction).

Another example of an event about the zone can indicate the video game player's zone, location, and orientation, at the time of starting the activity. This event can enable location-based help. A property of this event includes the activity identifier. Other properties are possible, such as optionally the zone identifier and the position and orientation of video game player's character in the video game.

Yet another example of an event about the zone can indicate the video game player's zone, location, and orientation, at the time of ending the activity. This event can also enable location-based help. A property of this event includes the activity identifier. Other properties are possible, such as optionally the outcome of the activity, the zone identifier, and the position and orientation of video game player's character in the video game.

The video game platform 150 can also collect data about an actor in a video game, where this data is reported similarly to the events based on predefinitions in program code of the video game. The actor represents an entity with behaviors in the video game. The actor can be player-controlled or game-controlled, and this can change dynamically during game play. The actor can be defined in the program code as an object with multiple properties. The properties include an actor identifier and a name. The actor identifier is a unique identifier of the actor. The name can be a localizable name of the actor. Other properties are possible including, for instance, an indication of whether the object should be treated as hidden for spoiler block uses cases (the default may be set to false), an image of the actor, and a short description of the actor. Multiple events about the actor are possible.

An example of an event about the actor can indicate that a change to the video game player's selection of actor(s). Selected actors represent the actors the video game player is controlling in the video game, and can be displayed on the video game player's profile and other presentation spaces. There can be more than one actor selected at a time. The video game should replace the list of actors upon loading save data. A property of this event includes a list (e.g. array) of actors which are currently selected by the video game player.

The video game platform 150 can also collect data about a mechanic in a video game, where this data is reported similarly to the events based on predefinitions in program code of the video game. The mechanic represents an item (e.g. tool), capability, skill, or effect that can be used by the video game player or the video game to impact game play (e.g. bow, arrow, stealth attack, fire damage). The mechanic generally excludes items that do not impact game play (e.g. collectibles). The mechanic can be defined in the program code as an object with multiple properties. The properties include a mechanic identifier and a name. The mechanic identifier is a unique identifier of the mechanic. The name can be a short localizable name of the mechanic. Other properties are possible including, for instance, an indication of whether the object should be treated as hidden for spoiler block uses cases (the default may be set to false), an image of the mechanic, and a short description of the mechanic. Multiple events about the mechanic are possible.

An example of an event about the mechanic can indicate that mechanics available to the video game player have changed. Availability of a mechanic represents that the mechanic is available in the game world for the video game player to use, but may necessitate the video game player to go through some steps to acquire it into inventory (e.g. download from a store, pick up from the world) before using it. This event can also be used to indicate lifting of spoiler block on the mechanic object, and to filter help tips to avoid suggesting use of a mechanic that is unavailable. The video game should replace the list of mechanics upon loading save data. A property of this event includes a list (e.g. array) of mechanics which are currently available.

Another example of an event about the mechanic can indicate that the video game player's inventory has changed. Inventory refers to mechanics that are immediately usable to the video game player without having to take additional steps in the video game before using it. Inventory information can be used to estimate a player's readiness for an activity. The video game should replace the list of inventory upon loading save data. A property of this event includes a list (e.g. array) of mechanics which are currently in inventory.

Yet another example of an event about the mechanic can indicate that the video game player's load out has changed. Load out represents the mechanics that are most immediately accessible to the video player, and is the subset of inventory which is displayable to the video game player. The video game should replace the list of mechanics upon loading save data. A property of this event includes a list (e.g. array) of mechanics which are now part of the active load out.

A further example of an event about the mechanic can indicate that the mechanic has been used by or against the video game player. Properties of this event include a list (e.g. array) of mechanics which were used (e.g. fire arrow, fire damage) and whether the mechanics were used by or against the video game player. Other properties are possible, such as optionally an initiator actor identifier (e.g. an identifier of the actor that initiated the use of the mechanic), a zone identifier of the initiator actor, and a position of the initiator actor.

Another example of an event about the mechanic can indicate that the mechanic had an impact on game play (e.g. an arrow hit a target). Properties of this event include a list (e.g. array) of mechanics which were used (e.g. fire arrow, fire damage) and whether the mechanics were used by or against the video game player. Other properties are possible, such as optionally the initiator actor identifier, the zone identifier of the initiator actor, the position of the initiator actor, a target actor identifier (e.g. an identifier of the actor targeted by the mechanic), a zone identifier of the target, a position of the target actor, and an identifier of a mechanic that mitigates the initiator's mechanic(s).

The video game platform 150 can also collect data about game media in a video game, where this data is reported similarly to the events based on predefinitions in program code of the video game. The game media represents a piece of media (text, audio, video, image) related to the video game, provided by the game developer. The game media may exist in-game (e.g. cut-scene, audio log, book) or may not (e.g. developer commentary). The game media can be defined in the program code as an object with multiple properties. The properties include a game media identifier, a name, a format, a category, an unlock rule, and a uniform resource locator (URL). The game media identifier is a unique identifier of the game media. The name can be a localizable name of the game media. The format can indicate the media format, such as whether the game media is an image, audio, video, text, etc. The category indicates a type of the game media, such as whether the game media is a cut-scene, audio-log, poster, developer commentary, etc. The unlock rule indicates whether the game media should be unlocked for all video game players or based on an activity or a specific game media event. The URL references a server-provisioned media file, where this server can be part of the game developer system 170 or the video game platform 150. Other properties are possible including, for instance, an indication of whether the object should be treated as hidden for spoiler block uses cases (the default may be set to false), an entitlement (e.g. indicating that only video game players who own a particular video game entitlement can unlock the game media), and an activity identifier (e.g. to associate the game media with a particular activity). Multiple events about the game media are possible.

An example of an event about the game media can indicate that a particular piece of game media has been unlocked for the video game player. A property of this event includes the game media identifier.

Another example of an event about the game media can indicate that a particular piece of game media has started in the video game. The game media object should be considered unlocked for the video game player at the corresponding time. A property of this event includes the game media identifier.

Yet another example of an event about the game media can indicate that a particular piece of game media has ended in the video game. A property of this event includes the game media identifier.

Figure 2:
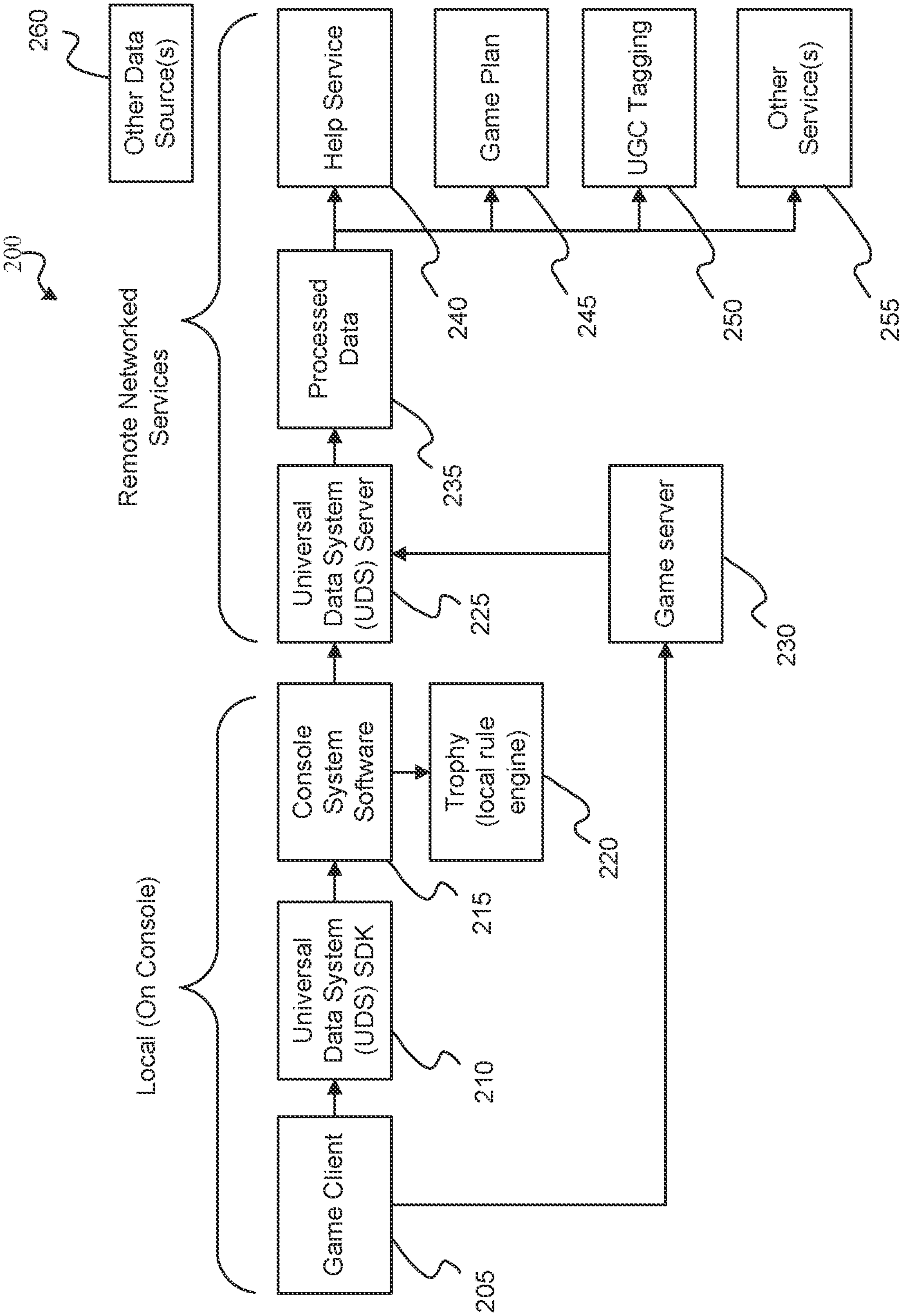
FIG. 2 illustrates an example of a system architecture for providing users with contextual information regarding available game activities, according to embodiments of the present disclosure.

FIG. 2 illustrates an example of a system architecture for providing users with contextual information regarding available game activities, according to embodiments of the present disclosure. In some embodiments, the exemplary system architecture 200 includes a game client 205, a universal data system (UDS) software development kit (SDK) 210, console system software 215, a local rule engine 220, a UDS server 225, a game server 230, processed data 235, and one or more other remote networked services, including a help service 240, game plan 245, user generated content (UGC) tagging 250, and other service(s) 255. The help service 240 may also receive information from other data source(s) 260. Some of the components of the system architecture 200 are examples of components of the video game platform 150 of FIG. 1. For instance, the UDS server 225 and the game server 230 are components of the video game platform 150.

The game client 205 and game server 230 provide contextual information regarding at least one application to a universal data system (UDS) server 225 via a UDS data model describing the logical structure of UDS data used by the UDS SDK 210. The UDS data model enables the platform (e.g. the video game platform 150) to realize remote networked services, such as the help service 240, game plan 245, UGC tagging 250, and other service(s) 255 that require game data, without requiring a game to be patched separately to support a service. The UDS data model assigns contextual information to a portion of information in a unified way across games. The contextual information from the game client 205 and UDS SDK 210 is provided to the UDS server 225 via the console system software 215. It is to be understood that the game client 205, UDS SDK 210, console system software 215, and local rule engine 220 may run on a computer or other suitable hardware for executing at least one application.

The UDS server 225 receives and stores contextual information from the game client 205 and game server 230 from at least one application. To be sure, the UDS server 225 may receive contextual information from a plurality of game clients and game servers for multiple users. The information may be uniformly processed 235 and then received by the plurality of remote networked services 240, 245, 250, and 255.

Figure 3:
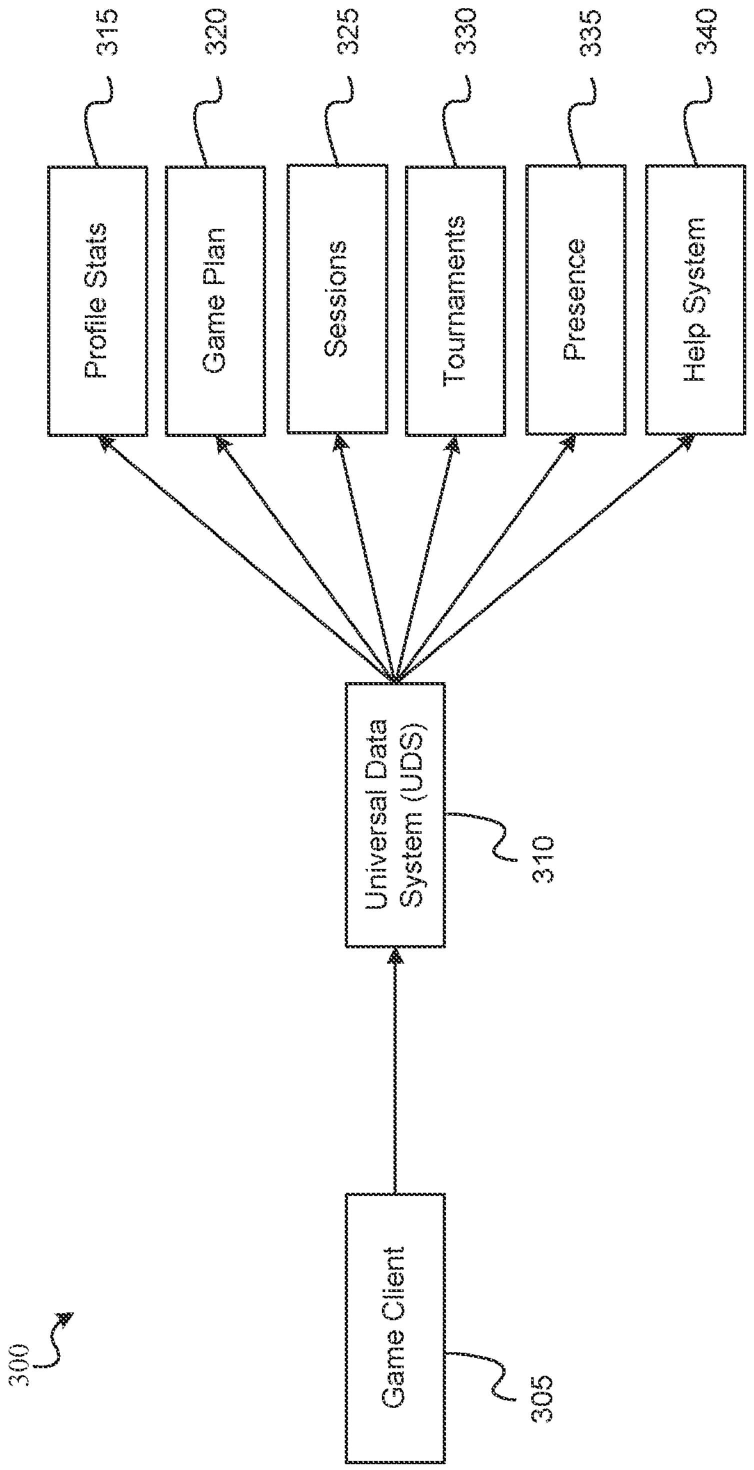
FIG. 3 illustrates another example of a system architecture, according to embodiments of the present disclosure.

FIG. 3 illustrates another example of a system architecture 300, according to embodiments of the present disclosure. A game client 305 sends contextual information to a UDS server 310, which provides the contextual information in a unified data model to a plurality of remote networked services, including profile stats 315, game plan 320, sessions 325, tournaments 330, presence 335, and help system 340.

Figure 4:
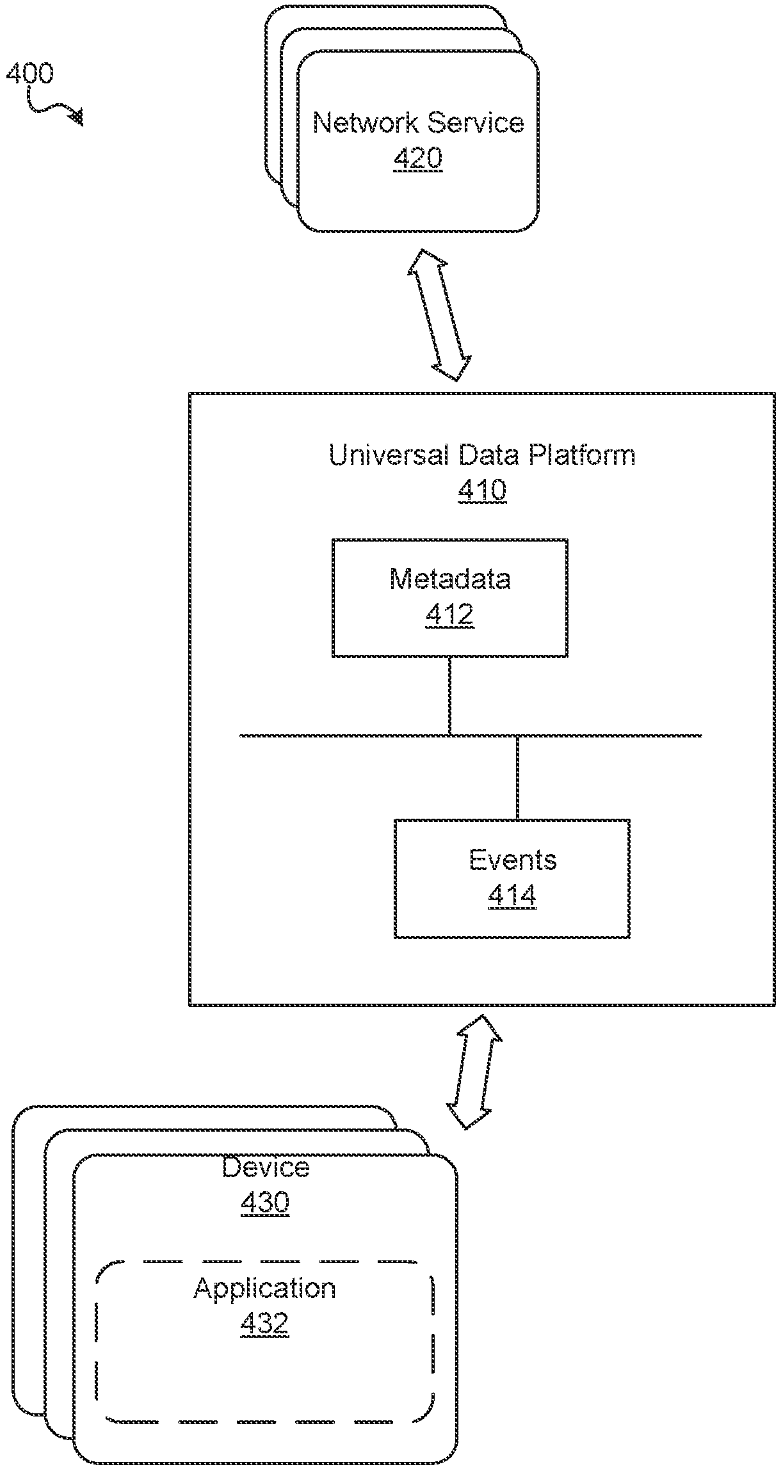
FIG. 4 illustrates an example of a system for providing a data model for a universal data platform, according to embodiments of the present disclosure.

FIG. 4 illustrates an example of a system 400 for providing a data model for a universal data platform 410, according to embodiments of the present disclosure. Some of the components of universal data platform 410 are examples of components of the video game platform 150 of FIG. 1. In one example embodiment, system 400 can include at least one device 430 configured to execute at least one of a plurality of applications 432, each application having an application data structure. The universal data platform 410 can be executed on one or more servers. The universal data platform 410 can include a data model which is uniform across the plurality of application data structures. The data model can include metadata 412 corresponding to at least one object indicated in the data model, and events 414 corresponding to a trigger condition associated with at least one metadata entry. The values of the metadata 412 and events 414 can be associated with a user profile. The universal data platform 410 can be configured to receive application data from the at least one device 430 and store the application data within the data model. The system 400 can also include a plurality of remote networked services 420 configured to access the application data from the universal data platform 410 using the data model.

In various embodiments, the metadata 412 may include: a list of all activities that a user can do in an application, an activity name, a description of the activity, a state of the activity (whether available, started, or completed), whether the activity is required to complete an objective or campaign, a completion reward for the activity, an intro or outro cut-scene, an in-game location, one or more conditions that must be met before the activity becomes available, and a parent activity that contains the activity as a sub-activity. Metadata 412 may further include: a list of abilities exercisable by the user, effects of each action, telemetry indicative of when actions and effects take place including corresponding timestamps and locations, an in-game coordinate system, a list of in-game branch situations, and telemetry indicative of when a branch situation is encountered and which option is selected by the user. A list of in-game statistics, items, lore, in-game zones and corresponding attributes regarding each statistic, item, lore, or zone may likewise be included in the metadata 412. In addition, the metadata 412 may indicate whether or not a particular activity, entity (such as a character, item, ability, etc.), setting, outcome, action, effect, location, or attribute should be marked as hidden.

Events 414 may be fired in response to several various trigger conditions. For example, such trigger conditions may include: an activity that was previously unavailable becomes available, a user starts an activity, a user ends an activity, an opening or ending cut-scene for an activity begins or ends, the user's in-game location or zone changes, an in-game statistic changes, an item or lore is acquired, an action is performed, an effect occurs, the user interacts with a character, item, or other in-game entity, and an activity, entity, setting, outcome, action, effect, location, or attribute is discovered. The events 414 may include further information regarding a state of the application when the events 414 were triggered, for example a timestamp, a difficulty setting and character statistics at the time a user starts or ends an activity, success or failure of an activity, or a score or duration of time associated with a completed activity. It is to be understood that metadata 412 and events 414 may include any and all contextual information related to activities described in the present disclosure.

Figure 5:
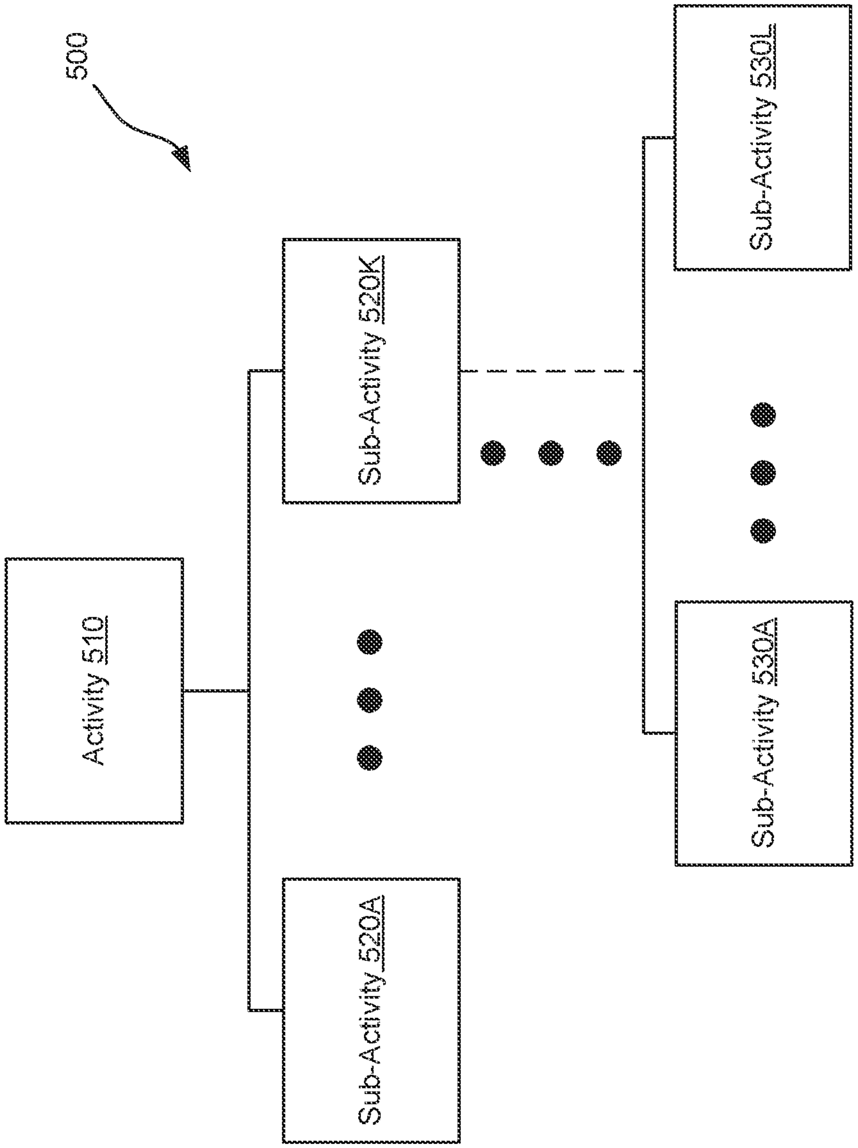
FIG. 5 illustrates an example of an activity hierarchy, according to embodiments of the present disclosure.

FIG. 5 illustrates an example of an activity hierarchy, according to embodiments of the present disclosure. As illustrated, an activity 510 can include multiple nested tasks, referred to herein as sub-activities, forming a hierarchy 500. The activity 510 can be a node on top of the hierarchy 500 (e.g. a root node) and can have a set of child sub-activities 520A-520K at the next level of the hierarchy 500. In turn each ones of the sub-activities 520A-520K may be a child node of the activity 510 and, possible, a parent node to a set of sub-activities at the next hierarchy level. For instance, the sub-activity 520K is a parent node to a set of sub-activities 530A-530L. This type of association between nodes, each representing a sub-activity, can be repeated at the different levels of the hierarchy 500. A set of mechanics can be associated with each node indicating that such mechanic(s) can be available or usable in the activity corresponding to the node.

As explained herein above, the activity 510 has an activity identifier. Each sub-activity also represents an activity and, thus, has an activity identifier too. Likewise, each of the mechanics has a mechanic identifier. Associations between the activity identifiers themselves and between the activity identifiers and the mechanic identifiers can be defined based on the hierarchy 500. Such associations can be stored in objects that define the activities (or sub-activities) and/or that define the mechanics and/or can be stored in events that relate to such objects. For instance, the activity identifier of the sub-activity 520K can be associated with the activity identifier of the activity 510 and/or the activity identifiers of the sub-activities 530A-530L. Similarly, the activity identifier of the sub-activity 530L can be associated with the activity identifier of the sub-activity 520L and/or the mechanic identifiers of the mechanics 540A-540M. Further, a mechanic identifier of a mechanic can be associated with an activity identifier.

Figure 6:
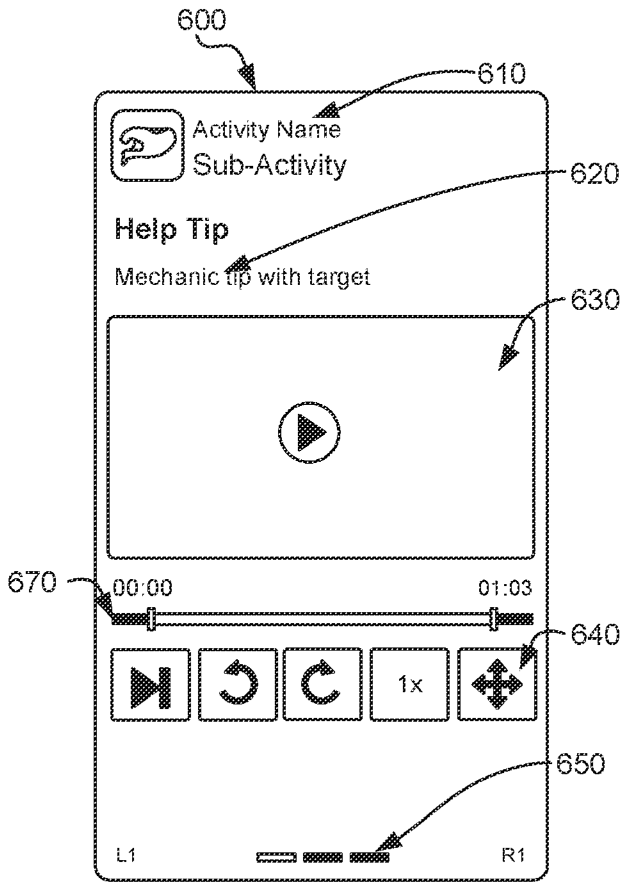
FIG. 6 illustrates an example of a user interface for presenting information about a help tip, according to embodiments of the present disclosure.

FIG. 6 illustrates an example of a user interface for presenting information about a help tip, according to embodiments of the present disclosure. In particular, a video game platform generates a graphical user interface to present a help tip to a user (e.g. a video game player), including information about a mechanic available to the user and interactive content describing the mechanic.

In some embodiments, the video game platform (e.g. the video game platform 150 of FIG. 1) sends information for a help tip to a video game console (e.g. the video game console 110 of FIG. 1) for presenting this information in a help tip window 600 on a display (e.g. the display 120 of FIG. 1). The help tip window 600 includes graphical content, such as a header 610 containing images and text identifying an activity and sub-activity in progress (e.g. the activity 510 and sub-activity 530A of FIG. 5). In an illustrative example, the header 610 includes an icon or badge associated with the video game. Alternatively, the icon or badge may represent the activity in progress. In some embodiments, the help tip window 600 also contains a mechanic tip 620, describing the use of a mechanic to help the user successfully complete the activity.

In addition, the help tip window 600 may include several interactive elements, including, but not limited to, audio-visual content 630, a link 640 to present the audio-visual content 630 in a large-size viewer, and a carousel control 650 to cycle between a number of available mechanic tips 620. For example, the video game platform may determine that for a given activity, three mechanics are available to a video game player that are associated with successful completion outcomes for a given activity. The carousel control 650 allows the player to view the mechanic tip 620 and audio-visual content 630 for each of the mechanics in a single help tip window 600. In some embodiments, the header 610 is static for each carousel control 650 selection.

In some embodiments, the audio-visual content 630 includes still frames of in-game images taken from the game itself. In addition, the audio-visual content 630 can include, but is not limited to, user-generated video and audio recordings of video game content that resulted in successful completion of the activity, identified from data for the plurality of video game players in the data store (e.g. the data store 152 of FIG. 1). In some embodiments, the audio-visual content 630 is uploaded to the video game platform from user devices. Alternatively, the audio-visual content 630 may be identified by event data stored in the data store (e.g. the event data 154 of FIG. 1) that may include activity identifiers, mechanic identifiers, estimated length of time for the activity, and time stamp information, among other data, which can be processed to generate appropriate audio or video recordings. The processing can be done automatically. In some embodiments, the audio-visual content 630 is processed such that the help tip window 600 presents only a segment of a larger media file. For instance, the help tip window 600 may include a tracking bar 670 showing the total duration of the audio-visual content 630 in one color (e.g. black), with a section of the tracking bar 670 in a second color (e.g. white) indicating the region of the audio-visual content 630 containing information relevant to the mechanic tip 620. In some embodiments, data received from a third party system (e.g. the third party system 190 in FIG. 1) includes spoiler content, including, but not limited to, in-game narrative scenes immediately following successful completion of the activity. The video game platform may exclude such spoiler content from audio-visual content 630 by limiting the segment of audio-visual content 630 that is presented in the help tip window 600 as shown in the tracking bar 670.

To illustrate, multiple video players may have played the video game and recorded video content showing their playtime. For each of such players, the video game platform receives the video content and event data. The event data indicates the use of a mechanic, timing information about the use, and the impact of the use in an activity (e.g., based on events related to the activity and the mechanic). The video game platform associates the timing with keyframes of the video content to generate a link to a specific portion of the video content (e.g., between two keyframes) showing the use of the mechanic. Such associations may be stored for multiple activities, mechanics, and video content recorded by multiple video game players. When generating the help tip window 630 about a mechanic in an activity for a particular user, the video game platform may select one or more of the video portions for addition to the help tip window 630. In particular, the video game platform identifies the specific video portions associated with the activity and the mechanic as a set of candidate video portions. The candidate video portions are ranked according to a set of sort factors. For instance, for each of the candidate video portion, the video game platform may look-up the corresponding event data of and determine whether the activity was completed, whether the mechanic had a positive impact. The video game platform may also determine matches between the video game player that recorded the candidate video portion and the user, such as whether the language of the recorded audio matches the language of the user, the in-game characteristic of the video game player that matches the in-game characteristic of the user, the video game player played the activity at the same difficulty as the user, and the like. The candidate video portions are ranked according to how the sort factors are met. The highest ranked candidate video portion may be presented as the audio-visual content 630.

Figure 7:
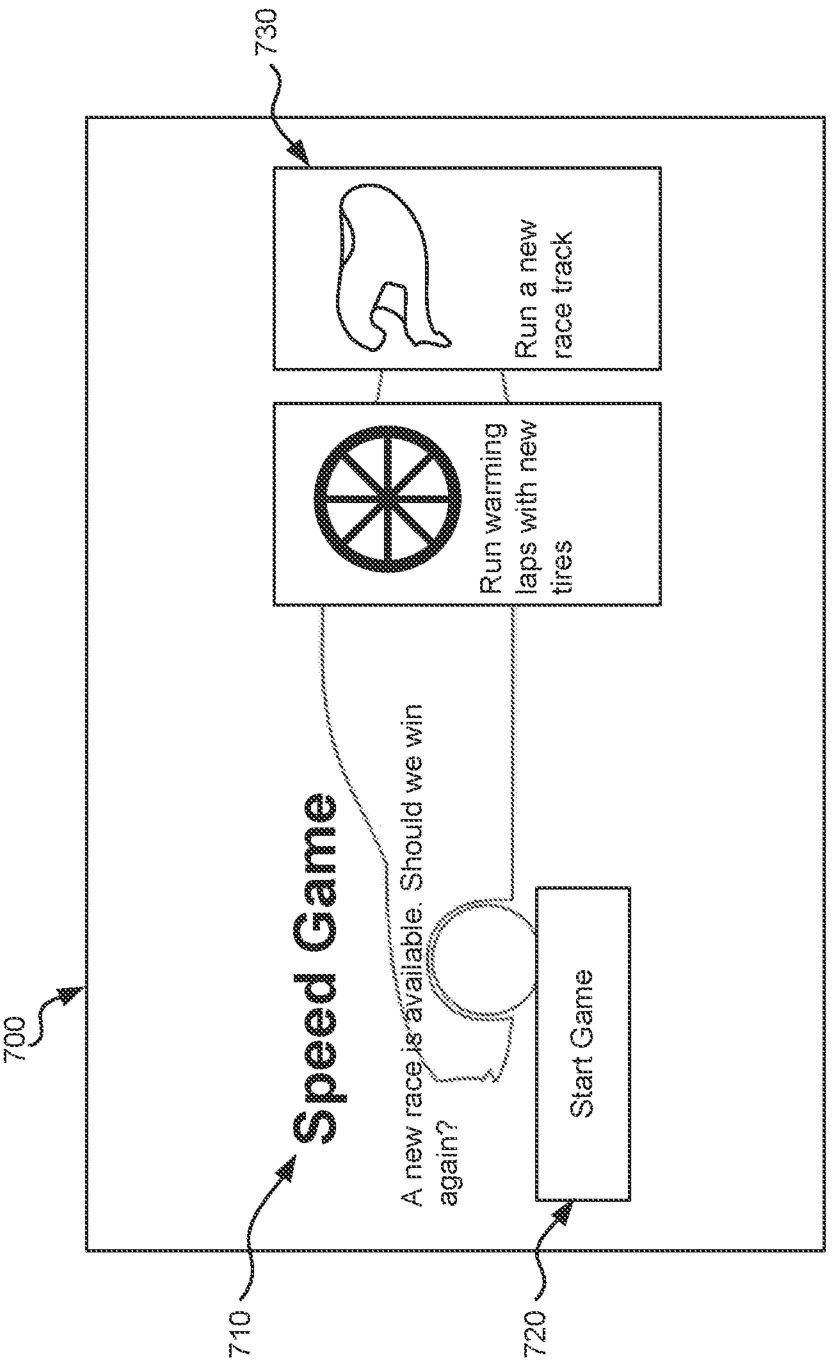
FIG. 7 illustrates an example of a user interface for presenting information about a video game, according to embodiments of the present disclosure.

FIG. 7 illustrates an example of a user interface for presenting information about a video game, according to embodiments of the present disclosure. In particular, a video game console (e.g. the video game console 110 of FIG. 1) presents video game-related functionalities to a user of a video game (e.g. the user 112 of FIG. 1). User input can be received to launch the activity following the presentation of the mechanic.

As illustrated in FIG. 7, the video game console presents a user interface 700 on a display (e.g. the display 120 of FIG. 1). The user interface 700 includes a video game page that shows various information and functionalities that relate to a video game. In an example, a short description 710 of the video game is presented (e.g. game title, the developer, an edition of the video game). A selectable option 720 to start the video game is also presented. Other information and functionalities are also possible.

In addition, a set of activity suggestions 730 is presented. Each one of the activity suggestions 730 can be presented in a window, an icon, an overlay, or any other graphical user interface element within the user interface 700. An activity suggestion 730 can identify an activity in the video game, where the activity is available to the user and not previously attempted or completed by the user. For instance, the activity suggestion 730 includes a textual description and an image of the activity, where such data is available from the object that defines the activity. A user selection of a suggested activity can trigger the video game console to launch the activity (e.g. locally or remotely based on an instance of the video game on the video game platform). Video game content related to the activity can be presented in the user interface 700.

Figure 8:
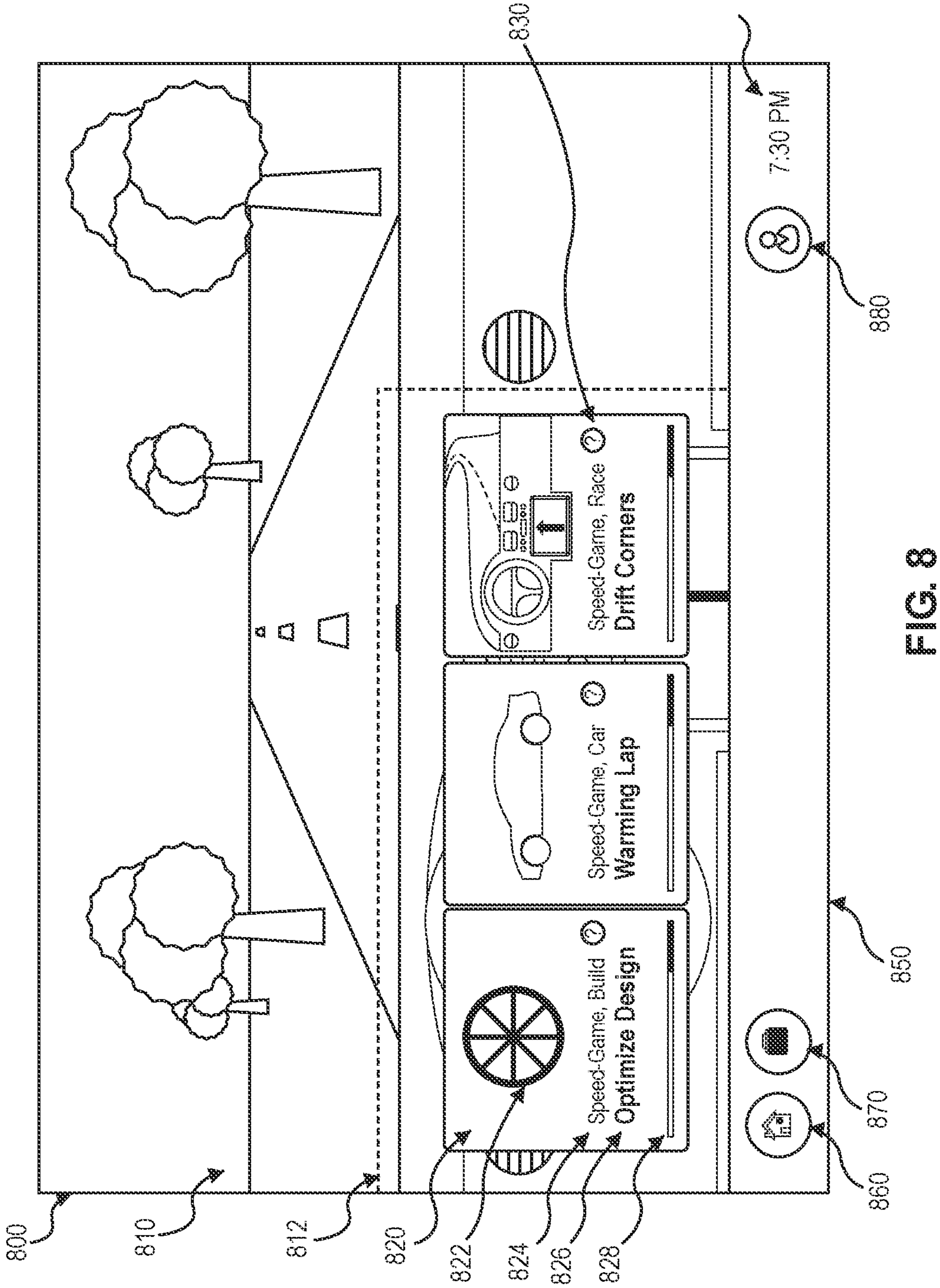
FIG. 8 illustrates an example of a user interface for presenting information about suggested help tips, according to embodiments of the present disclosure.

FIG. 8 illustrates an example of a user interface for presenting information about suggested help tips, according to embodiments of the present disclosure. In particular, a video game console (e.g. the video game console 110 of FIG. 1) presents various functionalities to a user (e.g. the user 112 of FIG. 1), where the functionalities correspond to different applications executing locally on the video game console, remotely on a video game platform (e.g. the video game platform 150 of FIG. 1), or distributed between the video game console and the video game platform. These functionalities can relate to any of video games, video streaming, audio streaming, social media communications, application and/or title downloads, application and/or title installations, and/or other available applications.

As illustrated in FIG. 8, the video game console presents a user interface 800 on a display (e.g. the display 120 of FIG. 1). In some embodiments, the video game console generates the user interface 800 as an overlay onto video game content 810. Based on user input at an input device (e.g. a selection of particular buttons on a video game joystick, a user utterance received by an audio sensor, a user gesture detected by an optical sensor, etc.), a menu 812 is presented in the user interface 800. The presentation can include an overlay of the menu 812 over at least a portion of the video game content 810, while the application continues to be executed.

The menu 812 can display a selection of available activities, for example, as one or more activity options 820 overlaid onto the game content 810. At least one of the activity options may be determined based on one or more activities that the user is involved in in the video game or other applications available from the video game console and/or the video game platform. Each activity option 820 can include information about the game and activity, including but not limited to a badge 822 representative of the game or activity, such as a logo, the name of the game and a top-level activity 824 and a sub-activity 826. In some embodiments, the activity option 820 includes a progress bar 828, displaying the progress made toward completion of the respective top-level activity 824 or sub-activity 826. Activity options 820 may also include a help information/indicator 830, indicating that a help tip is available for the sub-activity 826.

A user selection of any of the suggested activities presented in the menu 812 can be received. The corresponding activity can be launched. In addition, user selection of the help function linked to any of the suggested activities presented in the menu 812 can be received. A corresponding help function can be launched.

In some embodiments, the user interface 800 also includes a system interface 850 linked to the video game platform. The system interface 850 may include a home button 860 and a library button 870 linked to the platform-level interface, as well as a user profile icon 880 and other system information 890, including, but not limited to, a clock, network information, and battery level indicator.

Figure 9:
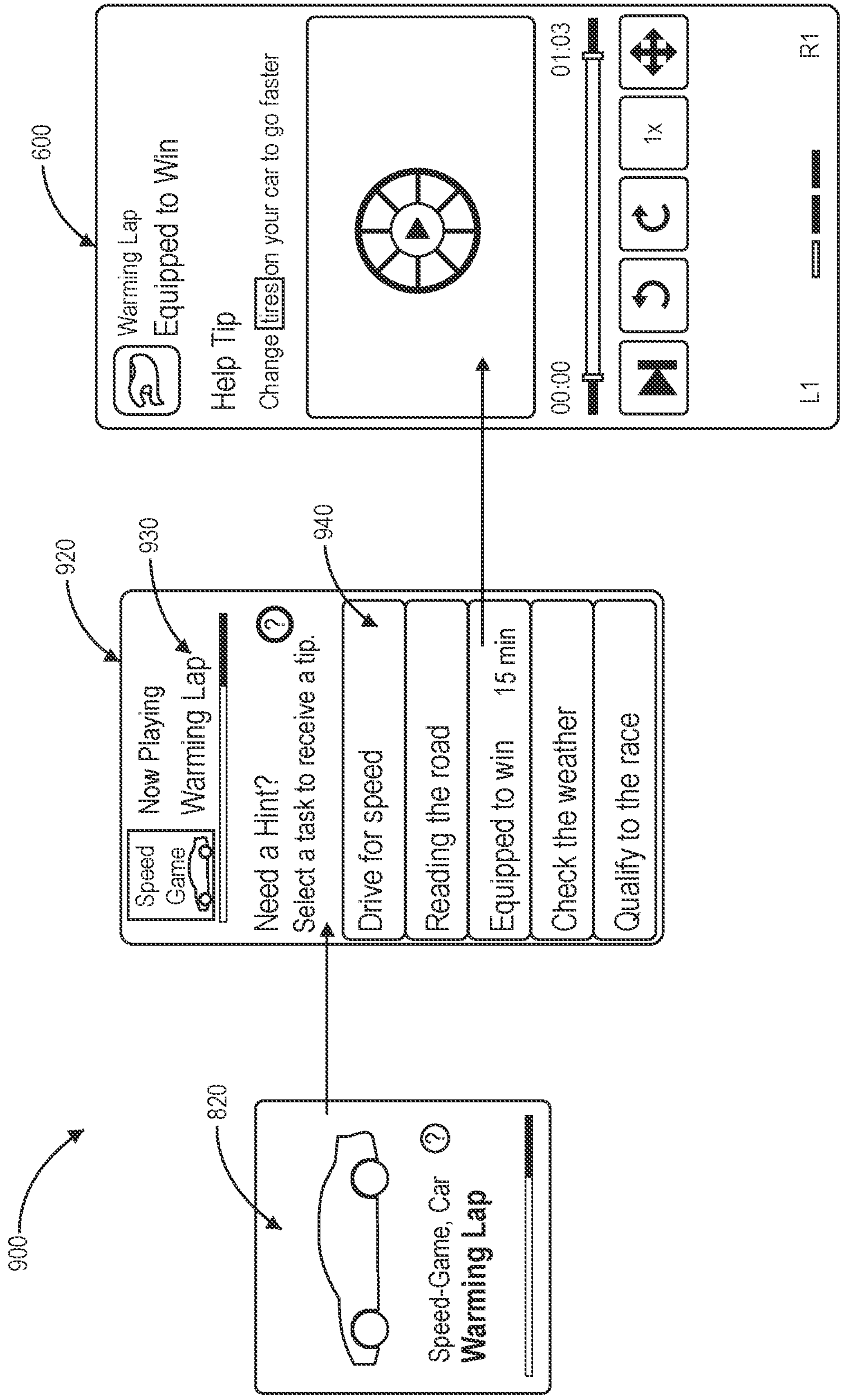
FIG. 9 illustrates an example of a help tip display through a user interface, according to embodiments of the present disclosure.

FIG. 9 illustrates an example of a help tip display through a user interface, according to embodiments of the present disclosure. In some embodiments, the video game platform links the activity option 820 displayed as part of the user interface 800 overlay to a hint menu 920. The hint menu 920 may include header information 930, including, but not limited to, identification of the game and the activity in progress, as well as a progress bar showing the player's progress toward completion of the activity. In some embodiments, the hint menu 920 presents a list of available hints in a menu interface of selectable options 940. In some embodiments, the selectable options 940 display the name of the activity and other information including, but not limited to, a duration of time associated with the activity or the help content. In some embodiments, the video game platform receives a user selection of one of the selectable options 940, in response to which an appropriate help tip window is displayed (e.g. the help tip window 600 of FIG. 6). As previously described, in reference to FIG. 6, the help tip window may contain text and audio-visual content demonstrating the use of a mechanic to successfully complete the sub-activity.

Figure 10:
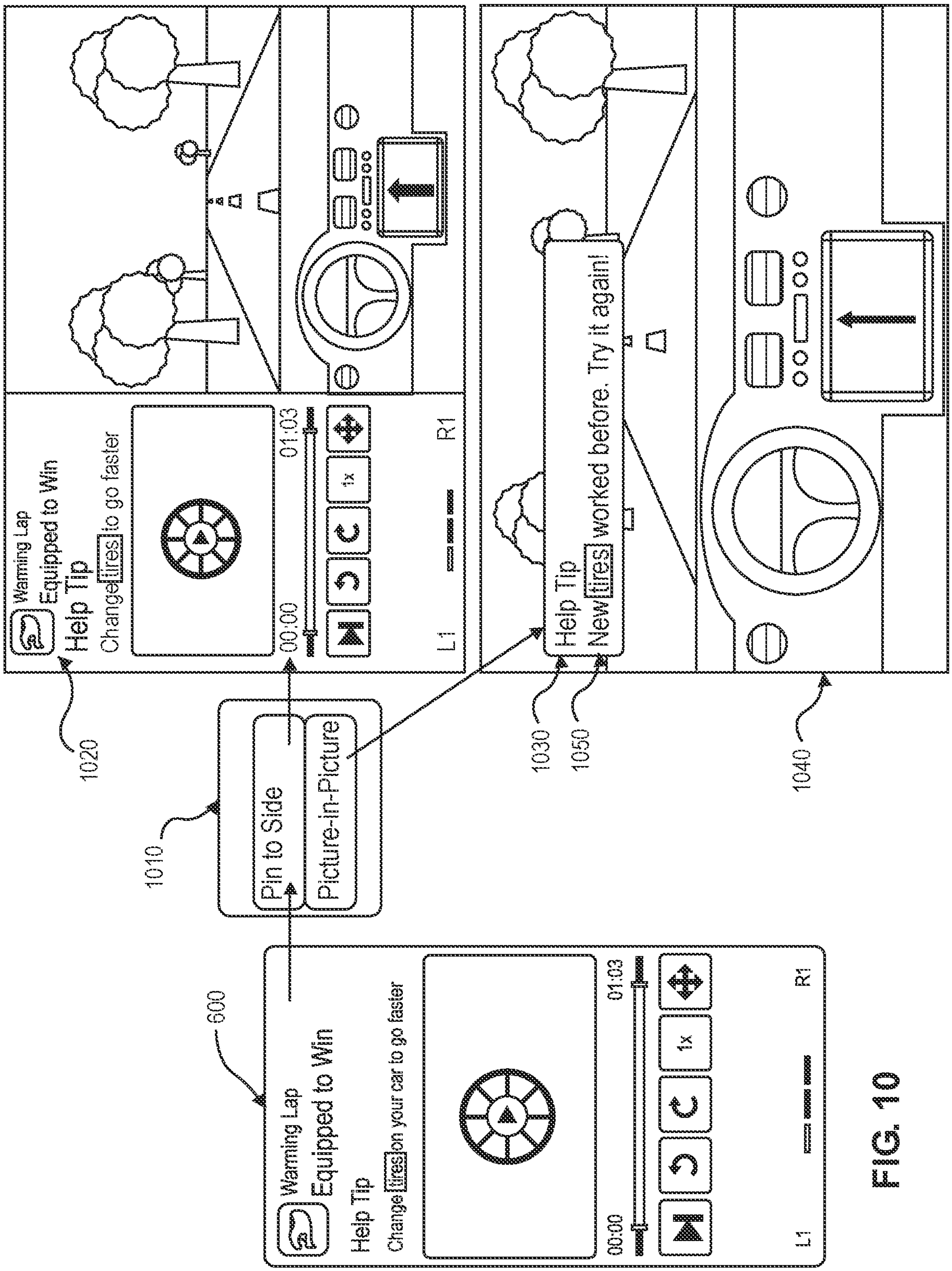
FIG. 10 illustrates examples of help tip display configurations, according to embodiments of the present disclosure.

FIG. 10 illustrates examples of help tip display configurations, according to embodiments of the present disclosure. In some embodiments, the video game platform receives user input to display a help tip window (e.g. the help tip window 600 of FIG. 6). The video game platform may present a configuration menu 1010 of display configuration options. For example, in response to user input, the video game platform may present help information in a side-pane 1020, where the help tip window occupies some portion of the display area, while the video game content 1040 is presented in the remaining portion of the display area. Alternatively, help tip information can be presented in a picture-in-picture 1030 configuration, superimposed over the video game content 1040. In both examples (e.g. pin to side and picture-in-picture), the video game content 1040 may continue at normal or fractional speed while help information is presented, such that the video game player may read the help tip or view the audio-visual content while also attempting to complete the activity. Alternatively, the content may pause, for example, while audio-visual content is played in the help tip window or played while occupying the entire display area.

In some embodiments, the mechanic tip may incorporate personalized text 1050 that reflects the history of use of the respective mechanic by the video game player. For example, when a player makes regular use of the mechanic (e.g. new tires), the mechanic tip may include text referencing that history of use (e.g. "New tires worked before. Try it again!"). In some embodiments, the personalized text 1050 includes reference to new targets for the mechanic or alternative uses of the mechanic, based on analysis of event data from the plurality of video game players.

Figure 11:
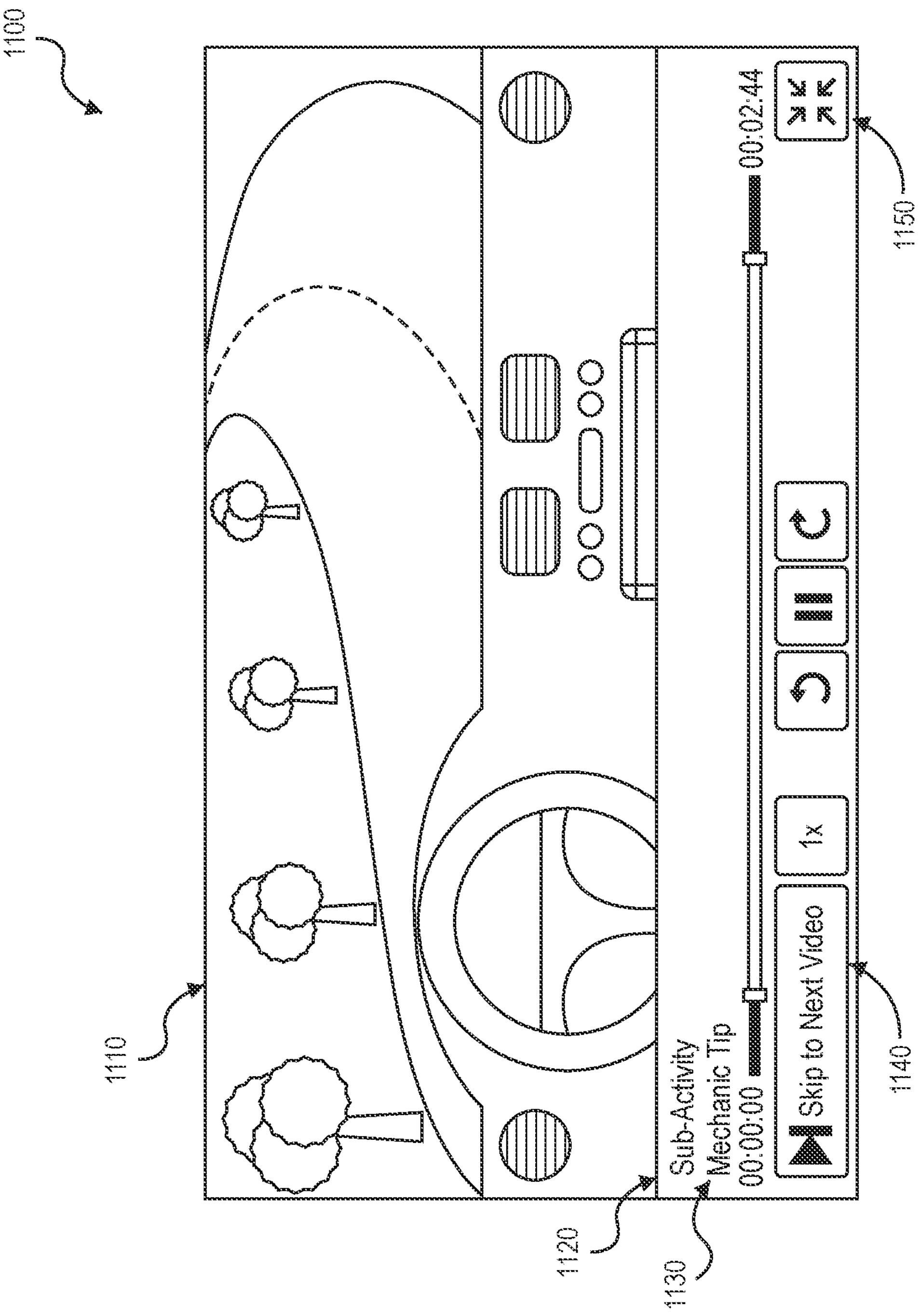
FIG. 11 illustrates an example of an expanded video player display through a user interface, according to embodiments of the present disclosure.

FIG. 11 illustrates an example of an expanded video player display through a user interface, according to embodiments of the present disclosure. In some embodiments, the video game platform receives a user selection to expand audio-visual content (e.g. the audio-visual content 630 of FIG. 6) to an expanded video player 1110 (e.g. through the link 640 of FIG. 6). The video game platform may display the expanded video player 1110 as a graphical user interface 1100 overlaid on video game content while occupying a large fraction of the display area. Alternatively, the expanded video player 1110 may take up the entire display area (e.g. playing the audio-visual content in "full screen" mode). In some embodiments the video game content is paused while the expanded video player 1110 is displayed. The expanded video game player 1110 may include several video controls 1120 along with the audio-visual content. In some embodiments, the video controls 1120 present additional information including, but not limited to, a video title 1130 identifying the activity and mechanic, an expanded tracking bar (e.g. the tracking bar 670 of FIG. 6), a skip button 1140 to skip ahead to audio-visual content describing an alternative mechanic also associated with the activity, reproducing the carousel control of the help tip window (e.g. the carousel control 650 of FIG. 6), video playback controls, and a minimize button 1150 to return to one of the viewing options previously described in reference to FIG. 10.

Figure 12:
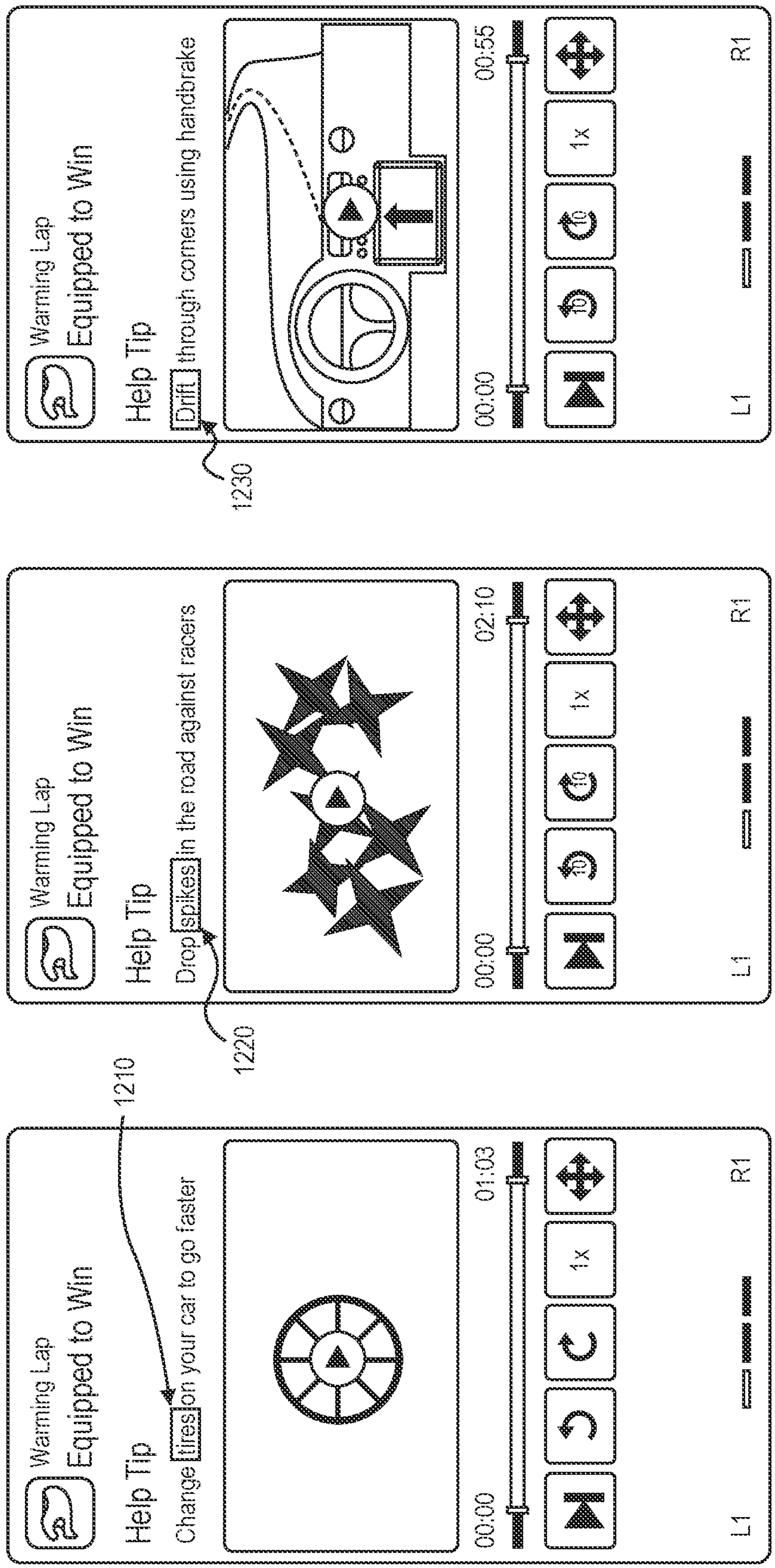
FIG. 12 illustrates examples of mechanic types, according to embodiments of the present disclosure, presenting help tip windows containing mechanic tips selected for the player.

FIG. 12 illustrates examples of mechanic types, according to embodiments of the present disclosure, presenting help tip windows containing mechanic tips selected for the player. In some embodiments, the mechanic is a capability or a set of capabilities 1210 allowing the player to successfully complete an activity or sub-activity (in this example, putting on the spare tires). In some embodiments, the mechanic is a set of tools 1220 (in one example, road spikes). In some embodiments, the mechanic is a set of skills 1230 (in one example, drifting).

FIG. 13 illustrates examples of mechanic tip types, according to embodiments of the present disclosure. In some embodiments, the video game platform determines a mechanic use tip (e.g. "use fireball"), as described in reference to the graphical user interface in FIGS. 6-12. In some embodiments, the video game platform determines from event data that a condition is present for which the video game platform will generate a condition-specific tip. The condition may include, but is not limited to, event data associated with video game content that is specific to a circumstance or challenge in the video game (e.g. a specific opponent non-player character, or an in-game obstacle). In some embodiments, the video game platform generates tip types 1300 including, but not limited to, mechanic use, mechanic avoidance (e.g. "avoid sword attack," or "don't use fireball"), mechanic use with a target actor (e.g. "use fireball against boss"), basic mechanic mitigation (e.g. "use parry against sword attack"), and mechanic mitigation (e.g. "use shield when boss uses sword attack").

In some embodiments, each mechanic tip includes information (text, audio, video, etc.) describing how to implement the tip. For example, a mechanic use tip may include text and video demonstrating the use of the mechanic to successfully complete the activity, as described in reference to FIGS. 6-12. Similarly, a mechanic avoidance tip may include information describing avoidance techniques (e.g. a video tutorial demonstrating use of virtual player movement controls in a video game to avoid incoming sword attacks). In some embodiments, mechanic tips identifying a target or target actor include information identifying the target and describing use of the mechanic against the target. For example, a mechanic tip with a target actor may include an image of the target actor taken from in-game screenshots, as well as a video tutorial demonstrating use of the mechanic against the target actor to successfully complete the activity. Basic mechanic mitigation tips may provide information to help the user identify a mitigation target (e.g. a sword attack) and to demonstrate the use of the mechanic to counter the mitigation target (e.g. a parry skill). In addition, mechanic mitigation tips may provide information to identify a target actor (e.g. a boss) and a mitigation target (e.g. a sword attack), as well as to demonstrate the use of the mechanic (e.g. the shield) to counter the mitigation target when it is used by the target actor.

Each of the mechanic tip types, as described in FIG. 13, may be generated by the video game platform based on event data from a plurality of video game players. The specific event data differs between tip types 1300, as described below. In some embodiments, the video game platform determines mechanic tips to display to the user by first determining a general list of mechanic tips valid for a given activity for all users, followed by personalizing the mechanic help tip for a specific user. In some embodiments, the video game platform generates condition specific tips, based on event data reflecting that a condition is present in the video game content. The general list of mechanic tips may be provided to the video game developer system (e.g. the video game developer system 170 of FIG. 1), whereupon the developer system may suppress one or more mechanic tips, also referred to as mechanic tip validation.

In some embodiments, to generate a mechanic use tip, the video game system first determines the general list of mechanics that are valid for a given activity based on event data including, but not limited to, activity identifier, mechanic identifier, activity outcome, mechanic impact, and condition presence, collected from a plurality of video game players, as discussed in reference to FIG. 1. In some embodiments, a different mechanic tip type is generated by reference to additional event data, specific to the mechanic tip type. The video game platform then determines the effectiveness of each mechanic in the general list for achieving a successful completion of the activity. In some embodiments, the effectiveness of each mechanic is determined through a successful completion rate, determined from event data stored in the data store. The successful completion rate, in turn, may be used to rank the valid mechanics, allowing suitable mechanics to be selected for providing mechanic tip information to aid with completion of the associated activity.

In reference to the mechanic target type, the video game platform may generate a mechanic tip that includes a mechanic target against which the mechanic is used. In some embodiments, the successful completion of an activity is associated with use of a mechanic against one or more specific targets. Specific targets include, but are not limited to, non-player characters and environmental effects (e.g. topographic barriers, weather effects, obstacles to navigation, puzzles, gauntlets, traps, and the like). The video game platform may account for targets when generating a list of valid mechanics by referencing event data associating mechanic impact with one or more mechanic targets. As an illustrative example, successful completion of an activity, such as crossing an impassible obstacle, may be highly correlated to the use of a specific tool mechanic, such as a rope, on a specific environmental target, such as a projecting wooden beam located over the obstacle. In another illustrative example, successful completion of an activity, such as a negotiation, may be highly correlated to the use of a specific skill or capability, such as *charisma*, persuasion, intimidation, or enchantment, when used on one or more target non-player characters before or during the activity. It is understood that many other types of targets are possible, beyond the two illustrative examples described here.

In reference to mechanic avoidance type, the video game platform may limit mechanic suggestions to exclude mechanics from the ranking for which the successful completion rate falls below a predefined threshold value. Alternatively, when the successful completion rate falls below the predefined threshold, the video game platform may generate a mechanic tip for avoidance of the mechanic in connection with the respective activity. To illustrate this concept in an example, a video game player may attempt to complete a combat activity (for example, a boss-fight where the activity requires the video game player to defeat a non-player character in simulated combat) using a bladed weapon tool, against which the combat opponent is resistant or invulnerable (for example, the boss-fight features a heavily armored opponent). In response, the video game platform may generate an avoidance tip associating the use of the mechanic with a failed outcome of the activity (e.g. "don't use sword attack against boss").

In some embodiments, event data indicate one or more mechanics have a highly negative impact on successful completion of an associated activity when used against the video game player. In such instances, the video game platform may generate an avoidance tip to indicate for the video game player to avoid the mechanic. As an illustrative example, the mechanic tip may suggest for the video game player to avoid a powerful bladed weapon attack during a combat activity.

In some embodiments, the video game platform personalizes mechanic tips for specific users by filtering the list of all valid mechanics to account for mechanic availability, re-ranking available mechanics based on user propensity to engage with the mechanic, and personalizing the tip presentation. As discussed in reference to FIG. 1, mechanic availability is determined from event data provided to the video game platform (e.g. the video game platform of FIG. 1).

In reference to a user's propensity to engage with a mechanic tip, event data for a specific video game player may indicate that the player prefers a given mechanic to a higher-ranked mechanic. The video game platform may adjust the mechanic ranking to accommodate the history of use of the mechanic by the video game player, as well as the player's propensity to engage with the mechanic tip as shown by event data corresponding to the player. For example, a player may be less likely to engage with a tip that suggests use of a mechanic that is not currently in the player's load out or inventory, relative to a tip suggesting a frequently used mechanic present in the player's load out.

In reference to personalizing tip presentation, the video game platform may add modifiers to the tip to reflect the video game player's prior use of the mechanic (e.g. the personalized textual tip 1050 of FIG. 10). In some embodiments, a mechanic tip may be generated for the player to acquire a mechanic that is not currently in the player's inventory, but is otherwise available, as discussed in connection with FIG. 1.

Figure 14:
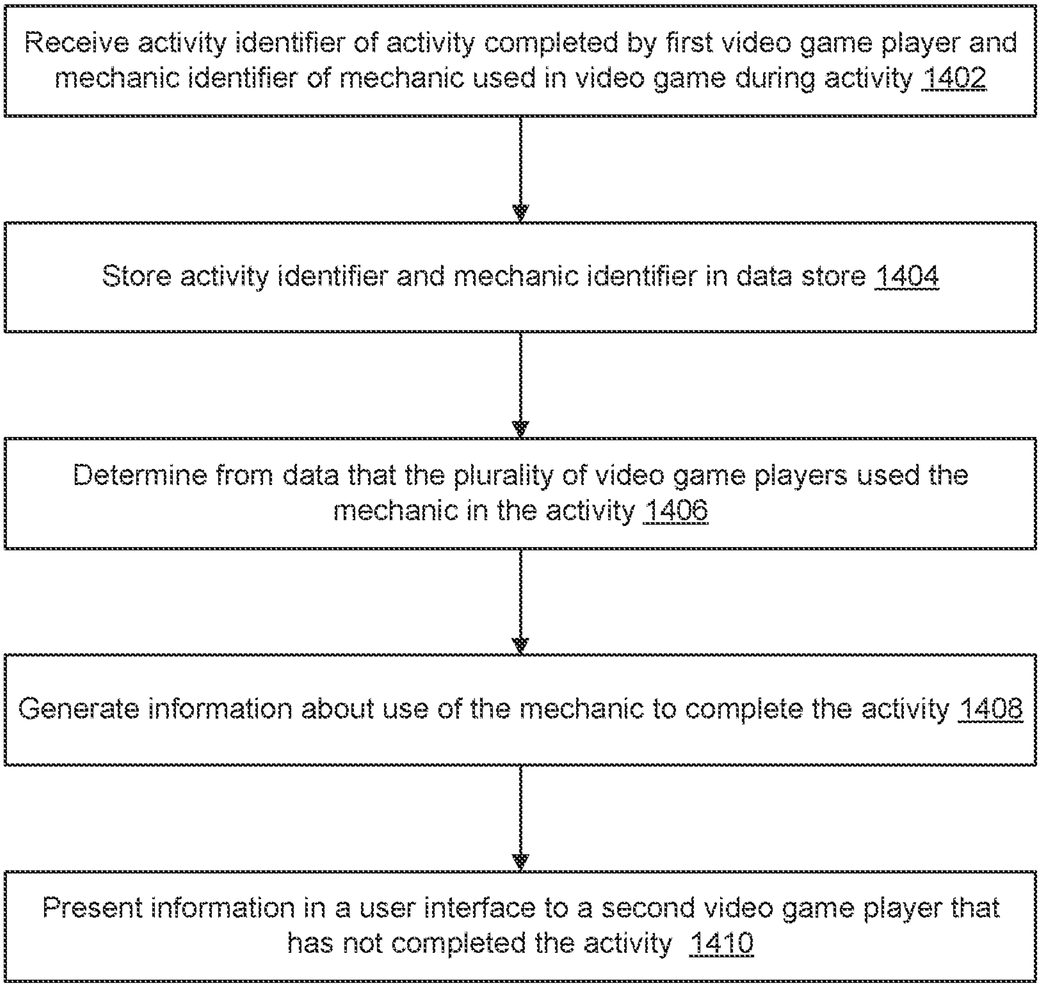
FIG. 14 illustrates an example of a flow for presenting information about a mechanic to help a video game player successfully complete an activity in a video game, according to embodiments of the present disclosure.
Figure 15:
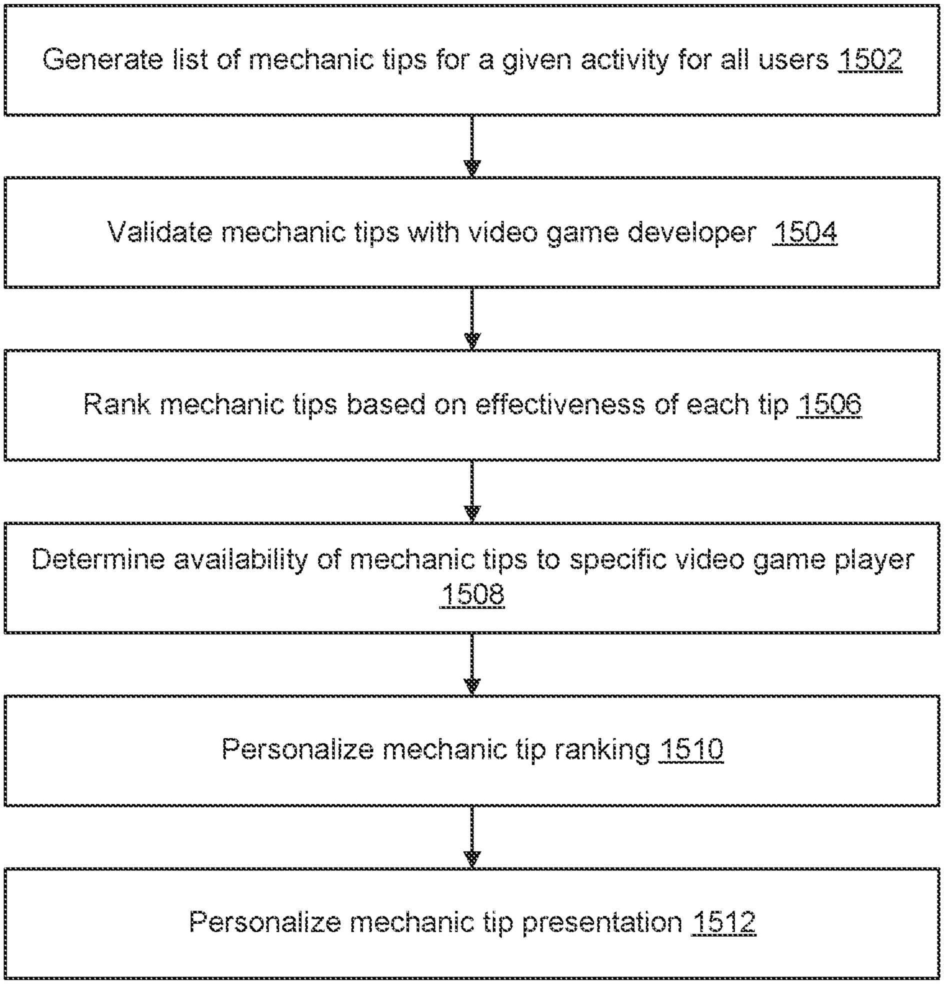
FIG. 15 illustrates an example of a flow for generating a list of mechanics tips for a given activity.

FIGS. 14-15 illustrate example flows for generating mechanic help tip information to help a video game player complete an activity in a video game. The operations of the flows can be implemented as hardware circuitry and/or stored as computer-readable instructions on a non-transitory computer-readable medium of a computer system, such as a video game console and/or a video game platform. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is required and that certain operations can be omitted.

FIG. 14 illustrates an example of a flow for presenting information about a mechanic to help a video game player successfully complete an activity in a video game, according to embodiments of the present disclosure. In an example, the flow includes operation 1402, where the computer system receives an identifier of the activity, an identifier of a mechanic used during the activity, and completion data indicating a completion of the activity by a video game player. As explained herein above, the activity identifier and the mechanic identifier are predefined in program code of the video game. The activity identifier, mechanic identifier, and the completion data are received based on an execution of the program code on, for instance, the video game console, the video game platform, and/or a remote system. For instance, the activity identifier, the mechanic identifier, and the completion data are received as events. Each of such events include the activity identifier as a property, the mechanic identifier as a property, either the start or the end of the activity as a property, and, optionally, an outcome of the activity.

In an example, the flow includes operation 1404, where the computer system stores the activity identifier, the mechanic identifier, and the completion data in a data store. For instance, the received events are stored as event data in the data store. The data store may store similar events for a plurality of other video game players, each of such events indicating either the activity or another activity (which can be in the video game or in another video game).

In an example, the flow includes operation 1406, where the computer system determines completion data for the activity for the plurality of video game players from the data store. For instance, the activity identifier is used to look up the stored event data and retrieve events that reference the activity identifier. Similarly, the mechanic identifier is used to determine from the data that the mechanic was used during the activity. The event data can indicate, for each of the video game players, the use of the mechanic during the activity, an outcome of the activity, and an impact of using the mechanic in the activity, as described in reference to FIG. 1. The use of the mechanic, its impact, the outcome of the activity, as well as any additional information including, but not limited to, target identifiers, mitigation target identifiers, and avoidance identifiers together represent the completion data.

In an example, the flow includes operation 1408, where the computer system generates information about mechanic use to complete the activity based on the determined completion data. The information may include mechanic avoidance information, information identifying one or more mechanic targets, mechanic mitigation information, and mechanic mitigation target information.

In an example, the flow includes operation 1410, where the computer system presents the generated information containing a mechanic suggestion to a user that has not completed the activity on a user device associated with the user. The computer system (e.g. the video game platform) sends the information to a video game console, that in turn presents this information on a graphical user interface, as described in reference to FIGS. 6-12 above.

FIG. 15 illustrates an example of a flow for generating a list of mechanics tips for a given activity. In an example, the flow includes operation 1502, where the computer system generates a list of mechanics associated with an activity or sub-activity overall. As described in reference to FIG. 13, the computer system generates the list of mechanic tips based in part on event data for a plurality of video game players stored in a data store, based on association of the mechanic with successful outcome of the given activity.

In an example, the flow includes operation 1504, where the computer system provides the list of mechanics to the video game developer system for validation. The video game developer system may suppress one or more mechanics from the list based on criteria including, but not limited to, quality, as described in reference to FIG. 13.

In an example, the flow includes operation 1506, where the computer system ranks the mechanic tips on the list. The ranking may incorporate mechanic impact and effectiveness data from the data store. The system may rank the mechanic tips based, in part, on a successful completion rate determined from event data associated with activity outcome, including, but not limited to, target identifiers, mechanic identifiers, etc., as described in reference to FIG. 13.

In an example, the flow includes operation 1508, where the computer system determines the availability of a mechanic tip to a specific video game player and filters the list to remove unavailable mechanics. In some embodiments, availability is determined based on event data, as in inventory and load-out, for example, as described in reference to FIG. 1.

In an example, the flow includes operation 1510, where the computer system determines the propensity of a user to engage with a mechanic tip, and re-ranks the available mechanic tips to account for propensity. Propensity may include prior use of the mechanic and presence of the mechanic in player inventory as described in reference to FIG. 13.

In an example, the flow includes operation 1512, where the computer system generates personalized tip presentation modifiers to indicate prior usage or inventory status of a mechanic for the specific video game player. The personalized tip presentation modifier may include a modified textual mechanic tip to indicate that the user has a history of using the mechanic. For example, words such as "again" or "keep using" may be added to a mechanic use tip, as described in reference to FIG. 10 and FIG. 13. Alternatively, the system may add text and other information to help the user acquire a mechanic that is available, but currently not present in the user's inventory or load out, as described in reference to FIG. 13.

Figure 16:
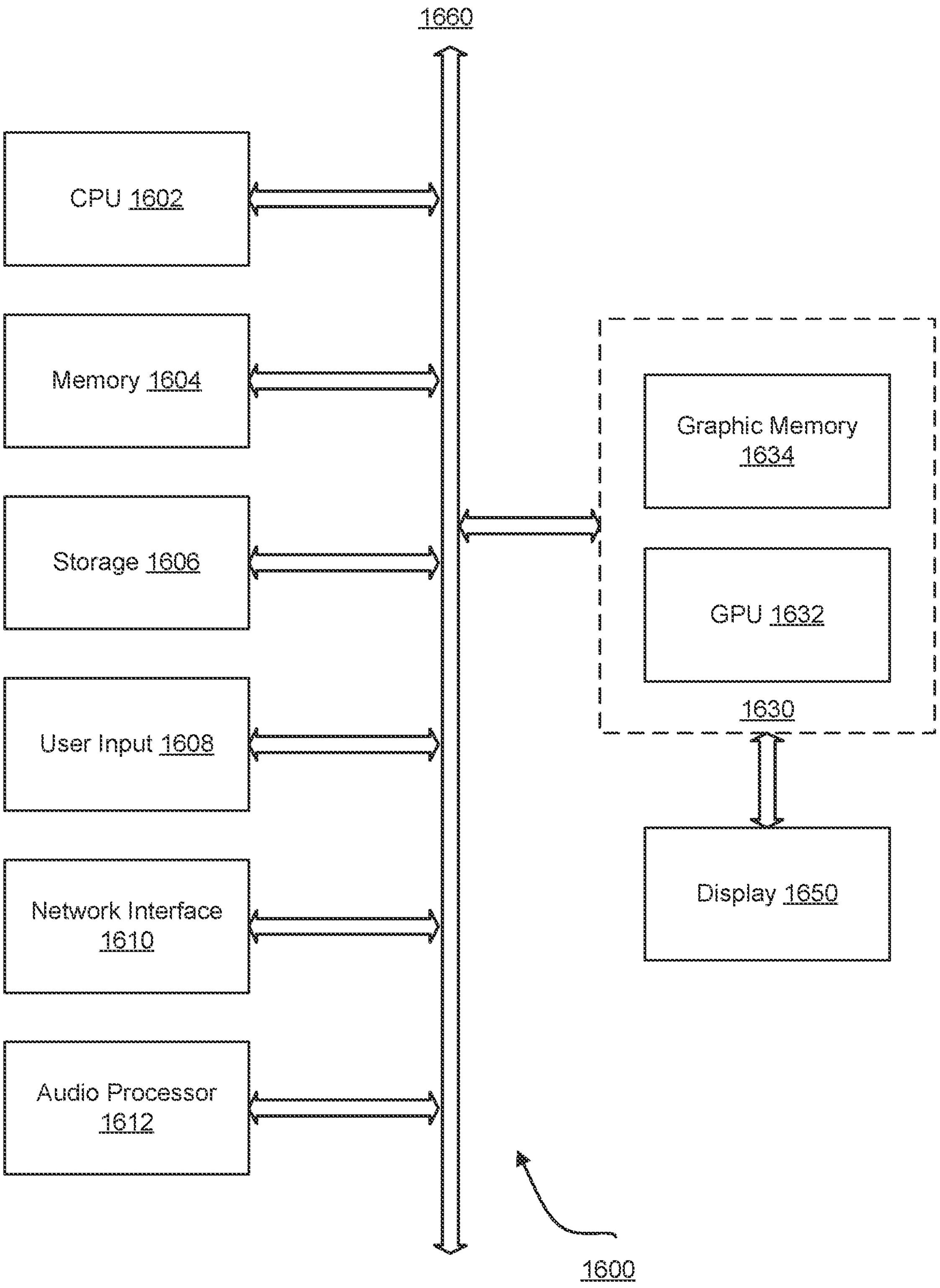
FIG. 16 illustrates an example of a hardware system suitable for implementing a computer system, according to embodiments of the present disclosure.

FIG. 16 illustrates an example of a hardware system suitable for implementing a computer system 1600, according to embodiments of the present disclosure. The computer system 1600 represents, for example, a video game console, a video game platform, or other types of a computer system. The computer system 1600 includes a central processing unit (CPU) 1602 for running software applications and optionally an operating system. The CPU 1602 may be made up of one or more homogeneous or heterogeneous processing cores. Memory 1604 stores applications and data for use by the CPU 1602. Storage 1606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1608 communicate user inputs from one or more users to the computer system 1600, examples of which may include keyboards, mice, joysticks, touch pads, touch screens, still or video cameras, and/or microphones. Network interface 1610 allows the computer system 1600 to communicate with other computer systems via an electronic communications network, and may include wired or wireless communication over local area networks and wide area networks such as the Internet. An audio processor 1612 is adapted to generate analog or digital audio output from instructions and/or data provided by the CPU 1602, memory 1604, and/or storage 1606. The components of computer system 1600, including the CPU 1602, memory 1604, data storage 1606, user input devices 1608, network interface 1610, and audio processor 1612 are connected via one or more data buses 1660.

A graphics subsystem 1630 is further connected with the data bus 1660 and the components of the computer system 1600. The graphics subsystem 1630 includes a graphics processing unit (GPU) 1632 and graphics memory 1634. The graphics memory 1634 includes a display memory (e.g. a frame buffer) used for storing pixel data for each pixel of an output image. The graphics memory 1634 can be integrated in the same device as the GPU 1632, connected as a separate device with the GPU 1632, and/or implemented within the memory 1604. Pixel data can be provided to the graphics memory 1634 directly from the CPU 1602. Alternatively, the CPU 1602 provides the GPU 1632 with data and/or instructions defining the desired output images, from which the GPU 1632 generates the pixel data of one or more output images. The data and/or instructions defining the desired output images can be stored in the memory 1604 and/or graphics memory 1634. In embodiments, the GPU 1632 includes 3D rendering capabilities for generating pixel data for output images from instructions and data defining the geometry, lighting, shading, texturing, motion, and/or camera parameters for a scene. The GPU 1632 can further include one or more programmable execution units capable of executing shader programs.

The graphics subsystem 1630 periodically outputs pixel data for an image from the graphics memory 1634 to be displayed on the display device 1650. The display device 1650 can be any device capable of displaying visual information in response to a signal from the computer system 1600, including CRT, LCD, plasma, and OLED displays. The computer system 1600 can provide the display device 1650 with an analog or digital signal.

In accordance with various embodiments, the CPU 1602 is one or more general-purpose microprocessors having one or more processing cores. Further embodiments can be implemented using one or more CPUs 1602 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 66%, 155%, 80%, 90%, 95%, 99%, 99.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method implemented on a platform configured to provide at least one uniform video-game service across multiple video games, the method including:

receiving, by the platform, an activity identifier of an activity completed by a first video game player in a video game and a mechanic identifier of a first mechanic used in the video game during the activity, wherein the first mechanic includes at least one of: a set of tools, a set of capabilities, or a set of skills available in the video game, and wherein the activity identifier and the mechanic identifier are predefined in program code of the video game according to a uniform data model defined for a plurality of video games, and are received based on an execution of the program code of the video game;

storing, by the platform, the activity identifier and the mechanic identifier in a data store;

determining, by a help service provided by the platform for the plurality of video games, based on activity identifiers and mechanic identifiers stored in the data store for a plurality of video game players, that the plurality of video game players used the first mechanic in the activity;

generating, by the help service provided by the platform, information about the first mechanic to complete the activity; and presenting, by the help service provided by the platform, the information in a window to a second video game player of the video game that has not completed the activity.

2. The method of claim 1, further including:

determining that the first mechanic is available to the second video game player, wherein the information is presented based on the first mechanic being available.

3. The method of claim 1, wherein the information includes at least one of: a text description, a link to a graphical animation, a link to a video file, or a link to an audio file, and wherein the window is presented over at least a portion of video game content of the video game.

4. The method of claim 3, wherein the window further includes a link to a video about using the first mechanic to complete the activity.

5. The method of claim 3, wherein the window further includes a map that corresponds to a zone within the video game content, wherein the zone shows an estimated position of where the activity was completed by the plurality of video game players and a current position of a virtual player within the video game content, and wherein the virtual player corresponds to the second video game player.

6. The method of claim 1, wherein determining that the first mechanic was used by the plurality of video game players includes:

generating a score for the first mechanic based on a frequency of the mechanic identifier being used successfully during the activity from data stored for the plurality of video game players in the data store.

7. The method of claim 6, further including:

receiving, after presenting the information and before receipt of a second activity identifier, the activity identifier, the mechanic identifier, and an outcome of completing the activity by the second video game player;

determining that the outcome is a successful completion; and updating the score based on the successful completion.

8. The method of claim 6, further including:

ranking, based on the score, the first mechanic relative to one or more other mechanics available to complete the activity; and selecting the first mechanic for presentation to the second video game player based on the ranking.

9. The method of claim 1, wherein the first mechanic is used in the video game during the activity to at least one of: (i) assist the first video game player improving at least one of the set of tools, the set of capabilities, or the set of skills, or (ii) assist the first video game player playing against another video game player or interacting with a video game object, and wherein the video game is associated with a video game developer, and the method further includes:

prior to presenting the information about the first mechanic, receiving a confirmation of the video game developer that the information is valid.

10. The method of claim 1, wherein determining that the first mechanic was used by the plurality of video game players includes:

accessing, from the data store, data for the plurality of video game players, wherein the data includes the activity identifier, the mechanic identifier, and a successful completion or a failed completion for each of the plurality of video game players; and determining, from the data, that a use of the first mechanic to complete the activity has a successful completion rate higher than a predefined threshold, wherein the information indicates the use of the first mechanic to complete the activity.

11. The method of claim 1, wherein determining that the first mechanic was used by the plurality of video game players includes:

accessing, from the data store, data for the plurality of video game players, wherein the data includes the activity identifier, the mechanic identifier, and a successful completion or a failed completion for each of the plurality of video game players; and determining, from the data, that a use of the first mechanic to complete the activity has a failed completion rate higher than a predefined threshold, wherein the information indicates avoidance of the use of the first mechanic to complete the activity.

12. The method of claim 1, wherein determining that the first mechanic was used by the plurality of video game players includes:

accessing, from the data store, data for the plurality of video game players, wherein the data includes the activity identifier, the mechanic identifier, and a successful completion or a failed completion for each of the plurality of video game players; and determining, from the data, that a use of the first mechanic to complete the activity when a condition is presented in the activity has a successful completion rate higher than a predefined threshold, wherein the information indicates the use of the first mechanic to complete the activity when the condition is present.

13. The method of claim 1, further including:

ranking the first mechanic for the second video game player relative to one or more other mechanics available to complete the activity based on at least one of: an availability of the first mechanic from an account of the second video game player, a spoiler included in the first mechanic about the activity or the video game, an availability of the first mechanic from an application store, or a history of use of the first mechanic by the second video game player.

14. The method of claim 1, wherein generating the information includes:

determining a history of use of the first mechanic by the second video game player; and personalizing the information for the second video game player based on the history.

15. The method of claim 1, wherein generating the information includes:

determining an availability of the first mechanic from an in-game store, an application store, or a platform store; and personalizing the information for the second video game player based on the availability.

16. A computer system including:

one or more processors; and one or more memories storing computer-readable instructions that, upon execution by the one or more processors, configure the computer system to:

receive, by a platform configured to provide at least one uniform video-game service across multiple video games, an activity identifier of an activity completed by a first video game player in a video game and a mechanic identifier of a first mechanic used in the video game during the activity, wherein the first mechanic includes at least one of: a set of tools, a set of capabilities, or a set of skills available in the video game, and wherein the activity identifier and the mechanic identifier are predefined in program code of the video game according to a uniform data model defined for a plurality of video games, and are received based on an execution of the program code of the video game;

store, by the platform, the activity identifier and the mechanic identifier in a data store;

determine, by a help service provided by the platform for the plurality of video games, based on activity identifiers and mechanic identifiers stored in the data store for a plurality of video game players, that the plurality of video game players used the first mechanic in the activity;

generate, by the help service, information about the first mechanic to complete the activity; and present, by the help service, the information in a window to a second video game player of the video game that has not completed the activity.

17. The computer system of claim 16, wherein the execution of the computer-readable instructions further configure the computer system to:

access, from the data store, data for the plurality of video game players, wherein the data includes the activity identifier, the mechanic identifier, and a difficulty setting for playing the video game; and associate the information about the first mechanic with the difficulty setting.

18. One or more non-transitory computer-readable storage media storing instructions that, upon execution on a computer system, cause the computer system to perform operations including:

receiving, by a platform configured to provide at least one uniform video-game service across multiple video games, an activity identifier of an activity completed by a first video game player in a video game and a mechanic identifier of a first mechanic used in the video game during the activity, wherein the first mechanic includes at least one of: a set of tools, a set of capabilities, or a set of skills available in the video game, and wherein the activity identifier and the mechanic identifier are predefined in program code of the video game according to a uniform data model defined for a plurality of video games, and are received based on an execution of the program code of the video game;

storing, by the platform, the activity identifier and the mechanic identifier in a data store;

determining, by a help service provided by the platform for the plurality of video games, based on activity identifiers and mechanic identifiers stored in the data store for a plurality of video game players, that the plurality of video game players used the first mechanic in the activity;

generating, by the help service provided by the platform, information about the first mechanic to complete the activity; and presenting, by the help service provided by the platform, the information in a window to a second video game player of the video game that has not completed the activity.

19. The one or more non-transitory computer-readable storage media of claim 18, wherein the activity is a task from a plurality of tasks that form a second activity, wherein the operations further include:

presenting an initial window in a first state to the second video game player, the initial window identifying the second activity and presented over video game content of the video game;

presenting the window in an expanded state upon a selection of the second activity, the window in the expanded state identifying the tasks of the second activity; and updating the window in the expanded state to present the information about the first mechanic upon a selection of the activity from the tasks.

20. The one or more non-transitory computer-readable storage media of claim 18, wherein the activity is a task from a plurality of tasks that form a second activity, wherein the operations further include:

receiving a first event indicating that the first mechanic is used by the first video game player during the activity and a second event indicating an impact of using the first mechanic on a game play in the activity, wherein the information is generated further based on the first event and the second event.

* * * * *